(12) United States Patent
Keijzer et al.

(10) Patent No.: US 11,567,945 B1
(45) Date of Patent: Jan. 31, 2023

(54) CUSTOMIZED DIGITAL CONTENT GENERATION SYSTEMS AND METHODS

(71) Applicant: Pegasystems Inc., Cambridge, MA (US)

(72) Inventors: Maarten A. Keijzer, Utrecht (NL); Vincent Jeffs, Marietta, GA (US); Shoel D. Perelman, Needham, MA (US); Robert Frederik Walker, Amsterdam (NL); Victor Khatutsky, Waltham, MA (US)

(73) Assignee: Pegasystems Inc., Cambridge, MA (US)

( * ) Notice: Subject to any disclaimer, the term of this patent is extended or adjusted under 35 U.S.C. 154(b) by 168 days.

(21) Appl. No.: 17/004,731

(22) Filed: Aug. 27, 2020

(51) Int. Cl.
*G06F 16/00* (2019.01)
*G06F 16/2455* (2019.01)
*G06F 16/25* (2019.01)
*G06F 9/54* (2006.01)
*G06Q 30/02* (2012.01)

(52) U.S. Cl.
CPC ........ *G06F 16/24568* (2019.01); *G06F 9/546* (2013.01); *G06F 16/258* (2019.01); *G06Q 30/0252* (2013.01); *G06Q 30/0269* (2013.01)

(58) Field of Classification Search
CPC combination set(s) only.
See application file for complete search history.

(56) References Cited

U.S. PATENT DOCUMENTS

| | | |
|---|---|---|
| 4,047,059 A | 9/1977 | Rosenthal |
| 4,344,142 A | 8/1982 | Diehr, II et al. |

(Continued)

FOREIGN PATENT DOCUMENTS

| | | |
|---|---|---|
| EP | 1163604 A2 | 12/2001 |
| EP | 1183636 A1 | 3/2002 |

(Continued)

OTHER PUBLICATIONS

Kuhn, H.W., The Hungarian Method for the Assignment Problem, Naval Research Logistics Quarterly, 2 (1955), pp. 83-97.

(Continued)

*Primary Examiner* — Farhan M Syed
(74) *Attorney, Agent, or Firm* — Davis Malm D'Agostine PC; David J. Powsner

(57) ABSTRACT

The invention provides in some aspects a method, executed on a digital data processing system, of mass generation of customized digital content that includes continuously identifying current external events taken by or with respect to a plurality of respective prospective targets and, upon identification of such an event, generating a set of actions, each identifying a digital content piece and a digital delivery mechanism therefor. Each action is generated, according to the method, based on the current identified events for a particular prospective target and on a database of information about prior events taken by or with respect to him/her. The sets of actions are queued upon generation and continuously retrieved on a first-in-first-out basis. And, upon retrieval, an action for generation of digital content for the respective prospective target is selected for transmittal from the set based on quotas associated with that target and/or the delivery mechanism identified for it per the selected action.

23 Claims, 2 Drawing Sheets

(56) References Cited

U.S. PATENT DOCUMENTS

| | | |
|---|---|---|
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,062,060 A | 10/1991 | Kolnick |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,337,407 A | 8/1994 | Bates et al. |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,586,311 A | 12/1996 | Davies et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,675,753 A | 10/1997 | Hansen et al. |
| 5,678,039 A | 10/1997 | Hinks et al. |
| 5,689,663 A | 11/1997 | Williams |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,243 A | 10/1998 | Rich et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,831,607 A | 11/1998 | Brooks |
| 5,832,483 A | 11/1998 | Barker |
| 5,841,435 A | 11/1998 | Dauerer et al. |
| 5,841,673 A | 11/1998 | Kobayashi et al. |
| 5,864,865 A | 1/1999 | Lakis |
| 5,873,096 A | 2/1999 | Lim et al. |
| 5,875,334 A | 2/1999 | Chow et al. |
| 5,875,441 A | 2/1999 | Nakatsuyama |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,892,512 A | 4/1999 | Donnelly et al. |
| 5,907,490 A | 5/1999 | Oliver |
| 5,907,837 A | 5/1999 | Ferrel et al. |
| 5,909,213 A | 6/1999 | Martin |
| 5,910,748 A | 6/1999 | Reffay et al. |
| 5,911,138 A | 6/1999 | Li et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,983,369 A | 11/1999 | Bakoglu et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,008,808 A | 12/1999 | Almeida et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,098,172 A | 8/2000 | Coss et al. |
| 6,105,035 A | 8/2000 | Monge et al. |
| 6,108,004 A | 8/2000 | Medl |
| 6,122,632 A | 9/2000 | Botts et al. |
| 6,125,363 A | 9/2000 | Buzzeo et al. |

(56) References Cited

U.S. PATENT DOCUMENTS

| | | |
|---|---|---|
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,332 B1 | 5/2001 | Anderson et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,281,896 B1 | 8/2001 | Alimpich et al. |
| 6,282,547 B1 | 8/2001 | Hirsch |
| 6,300,947 B1 | 10/2001 | Kanevsky |
| 6,304,259 B1 | 10/2001 | DeStefano |
| 6,308,163 B1 | 10/2001 | Du et al. |
| 6,310,951 B1 | 10/2001 | Wineberg et al. |
| 6,311,324 B1 | 10/2001 | Smith et al. |
| 6,313,834 B1 | 11/2001 | Lau et al. |
| 6,314,415 B1 | 11/2001 | Mukherjee |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,344,862 B1 | 2/2002 | Williams et al. |
| 6,349,238 B1 | 2/2002 | Gabbita et al. |
| 6,351,734 B1 | 2/2002 | Lautzenheiser et al. |
| 6,356,286 B1 | 3/2002 | Lawrence |
| 6,356,897 B1 | 3/2002 | Gusack |
| 6,359,633 B1 | 3/2002 | Balasubramaniam et al. |
| 6,366,299 B1 | 4/2002 | Lanning et al. |
| 6,369,819 B1 | 4/2002 | Pitkow et al. |
| 6,370,537 B1 | 4/2002 | Gilbert et al. |
| 6,380,910 B1 | 4/2002 | Moustakas et al. |
| 6,380,947 B1 | 4/2002 | Stead |
| 6,381,738 B1 | 4/2002 | Choi et al. |
| 6,389,460 B1 | 5/2002 | Stewart et al. |
| 6,389,510 B1 | 5/2002 | Chen et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,421,571 B1 | 7/2002 | Spriggs et al. |
| 6,426,723 B1 | 7/2002 | Smith et al. |
| 6,429,870 B1 | 8/2002 | Chen et al. |
| 6,430,571 B1 | 8/2002 | Doan et al. |
| 6,430,574 B1 | 8/2002 | Stead |
| 6,437,799 B1 | 8/2002 | Shinomi |
| 6,446,065 B1 | 9/2002 | Nishioka et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,453,038 B1 | 9/2002 | McFarlane et al. |
| 6,463,346 B1 | 10/2002 | Flockhart et al. |
| 6,463,440 B1 | 10/2002 | Hind et al. |
| 6,469,715 B1 | 10/2002 | Carter et al. |
| 6,469,716 B1 | 10/2002 | Carter et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,731 B1 | 12/2002 | Jones et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,217 B1 | 3/2003 | Maguire, III et al. |
| 6,529,899 B1 | 3/2003 | Kraft et al. |
| 6,529,900 B1 | 3/2003 | Patterson et al. |
| 6,530,079 B1 | 3/2003 | Choi et al. |
| 6,532,474 B2 | 3/2003 | Iwamoto et al. |
| 6,539,374 B2 | 3/2003 | Jung |
| 6,542,912 B2 | 4/2003 | Meltzer et al. |
| 6,546,381 B1 | 4/2003 | Subramanian et al. |
| 6,546,406 B1 | 4/2003 | DeRose et al. |
| 6,549,904 B1 | 4/2003 | Ortega et al. |
| 6,556,226 B2 | 4/2003 | Gould et al. |
| 6,556,983 B1 | 4/2003 | Altschuler et al. |
| 6,556,985 B1 | 4/2003 | Karch |
| 6,559,864 B1 | 5/2003 | Olin |
| 6,560,592 B1 | 5/2003 | Reid et al. |
| 6,560,649 B1 | 5/2003 | Mullen et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,381 B1 | 7/2003 | Eskridge et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,889 B1 | 12/2003 | Flockhart et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,690,788 B1 | 2/2004 | Bauer et al. |
| 6,691,067 B1 | 2/2004 | Ding et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshavsky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Stephen Chen et al. |
| RE38,633 E | 10/2004 | Srinivasan |
| 6,804,330 B1 | 10/2004 | Jones et al. |
| 6,807,632 B1 | 10/2004 | Carpentier et al. |
| 6,810,429 B1 | 10/2004 | Walsh et al. |
| 6,820,082 B1 | 11/2004 | Cook et al. |
| 6,829,655 B1 | 12/2004 | Huang et al. |

(56) References Cited

U.S. PATENT DOCUMENTS

| | | |
|---|---|---|
| 6,831,668 B2 | 12/2004 | Cras et al. |
| 6,836,275 B1 | 12/2004 | Arquie et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,925,609 B1 | 8/2005 | Lucke |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker |
| 6,961,725 B2 | 11/2005 | Yuan et al. |
| 6,965,889 B2 | 11/2005 | Serrano-Morales et al. |
| 6,966,033 B1 | 11/2005 | Gasser et al. |
| 6,976,144 B1 | 12/2005 | Trefler et al. |
| 6,978,719 B2 | 12/2005 | Sebata et al. |
| 6,985,912 B2 | 1/2006 | Mullins et al. |
| 6,991,153 B2 | 1/2006 | Silverbrook et al. |
| 7,020,869 B2 | 3/2006 | Abrar et al. |
| 7,020,882 B1 | 3/2006 | Lewallen |
| 7,028,225 B2 | 4/2006 | Maso et al. |
| 7,031,901 B2 | 4/2006 | Abu El Ata |
| 7,035,808 B1 | 4/2006 | Ford |
| 7,058,367 B1 | 6/2006 | Luo et al. |
| 7,058,637 B2 | 6/2006 | Britton et al. |
| 7,064,766 B2 | 6/2006 | Beda et al. |
| 7,073,177 B2 | 7/2006 | Foote et al. |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,178,109 B2 | 2/2007 | Hewson et al. |
| 7,194,380 B2 | 3/2007 | Barrow et al. |
| 7,194,690 B2 | 3/2007 | Guillermo et al. |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,343,295 B2 | 3/2008 | Pomerance |
| 7,353,229 B2 | 4/2008 | Vilcauskas, Jr. et al. |
| 7,353,254 B2 | 4/2008 | Kusuda |
| 7,398,391 B2 | 7/2008 | Carpentier et al. |
| 7,406,475 B2 | 7/2008 | Dorne et al. |
| 7,412,388 B2 | 8/2008 | Dalal et al. |
| 7,415,731 B2 | 8/2008 | Carpentier et al. |
| 7,505,827 B1 | 3/2009 | Boddy et al. |
| 7,526,481 B1 | 4/2009 | Cusson et al. |
| 7,536,294 B1 | 5/2009 | Stanz et al. |
| 7,555,645 B2 | 6/2009 | Vissapragada |
| 7,574,494 B1 | 8/2009 | Mayernick et al. |
| 7,596,504 B2 | 9/2009 | Hughes et al. |
| 7,603,625 B2 | 10/2009 | Guillermo et al. |
| 7,640,222 B2 | 12/2009 | Trefler |
| 7,647,417 B1 | 1/2010 | Taneja |
| 7,665,063 B1 | 2/2010 | Hofmann et al. |
| 7,685,013 B2 | 3/2010 | Gendler |
| 7,689,447 B1 | 3/2010 | Aboujaoude et al. |
| 7,711,919 B2 | 5/2010 | Trefler et al. |
| 7,779,395 B1 | 8/2010 | Chotin et al. |
| 7,783,596 B2 | 8/2010 | Smolen et al. |
| 7,787,609 B1 | 8/2010 | Flockhart et al. |
| 7,791,559 B2 | 9/2010 | Piasecki |
| 7,818,506 B1 | 10/2010 | Shepstone et al. |
| 7,844,594 B1 | 11/2010 | Holt et al. |
| 7,870,244 B2 | 1/2011 | Chong et al. |
| 7,889,896 B2 | 2/2011 | Roehrig et al. |
| 7,937,690 B2 | 5/2011 | Casey |
| 7,971,180 B2 | 6/2011 | Kreamer et al. |
| 7,974,714 B2 | 7/2011 | Hoffberg |
| 7,983,895 B2 | 7/2011 | McEntee et al. |
| 8,001,519 B2 | 8/2011 | Conallen et al. |
| 8,037,329 B2 | 10/2011 | Leech et al. |
| 8,073,802 B2 | 12/2011 | Trefler |
| 8,250,525 B2 | 8/2012 | Khatutsky |
| 8,335,704 B2 | 12/2012 | Trefler et al. |
| 8,386,960 B1 | 2/2013 | Eismann et al. |
| 8,468,492 B1 | 6/2013 | Frenkel |
| 8,479,157 B2 | 7/2013 | Trefler et al. |
| 8,516,193 B1 | 8/2013 | Clinton et al. |
| 8,739,044 B1 | 5/2014 | Varadarajan |
| 8,744,999 B2 | 6/2014 | Clarke et al. |
| 8,843,435 B1 | 9/2014 | Trefler et al. |
| 8,850,362 B1 | 9/2014 | Khoshnevisan et al. |
| 8,863,008 B2 | 10/2014 | Chan et al. |
| 8,880,487 B1 | 11/2014 | Clinton et al. |
| 8,903,933 B1 | 12/2014 | Bellini, III et al. |
| 8,924,335 B1 | 12/2014 | Trefler et al. |
| 8,959,480 B2 | 2/2015 | Trefler et al. |
| 9,026,733 B1 | 5/2015 | Clinton et al. |
| 9,189,361 B2 | 11/2015 | Khatutsky |
| 9,195,936 B1 | 11/2015 | Chase |
| 9,253,129 B2 | 2/2016 | Bassemir et al. |
| 9,270,743 B2 | 2/2016 | Frenkel |
| 9,495,340 B2 | 11/2016 | Powell et al. |
| 9,658,735 B2 | 5/2017 | Trefler et al. |
| 9,678,719 B1 | 6/2017 | Frenkel |
| 10,453,083 B2 | 10/2019 | Herman et al. |
| 10,601,751 B1 * | 3/2020 | Hyman ................ H04L 67/306 |
| 10,713,225 B2 * | 7/2020 | Gonzalez-Brenes ........................ G06F 16/213 |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2001/0054064 A1 | 12/2001 | Kannan |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0065912 A1 | 5/2002 | Catchpole et al. |
| 2002/0070972 A1 | 6/2002 | Windl et al. |
| 2002/0073337 A1 | 6/2002 | Ioele et al. |
| 2002/0083063 A1 | 6/2002 | Egolf |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0093537 A1 | 7/2002 | Bocioned et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120627 A1 | 8/2002 | Mankoff |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0181692 A1 | 12/2002 | Flockhart et al. |
| 2002/0184610 A1 | 12/2002 | Chong et al. |
| 2002/0186826 A1 | 12/2002 | Hsu et al. |

(56) References Cited

U.S. PATENT DOCUMENTS

| | | |
|---|---|---|
| 2002/0198935 A1 | 12/2002 | Allen, Sr. et al. |
| 2003/0001894 A1 | 1/2003 | Boykin et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Schuetze et al. |
| 2003/0084401 A1 | 5/2003 | Abel et al. |
| 2003/0093279 A1 | 5/2003 | Malah et al. |
| 2003/0098991 A1 | 5/2003 | Laverty et al. |
| 2003/0109951 A1 | 6/2003 | Hsiung et al. |
| 2003/0115281 A1 | 6/2003 | McHenry et al. |
| 2003/0135358 A1 | 7/2003 | Lissauer et al. |
| 2003/0152212 A1 | 8/2003 | Burok et al. |
| 2003/0154380 A1 | 8/2003 | Richmond et al. |
| 2003/0191626 A1 | 10/2003 | Al-Onaizan et al. |
| 2003/0198337 A1 | 10/2003 | Lenard |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0003043 A1 | 1/2004 | Rajamony et al. |
| 2004/0021686 A1 | 2/2004 | Barberis |
| 2004/0024603 A1 | 2/2004 | Mahoney et al. |
| 2004/0034651 A1 | 2/2004 | Gupta et al. |
| 2004/0049479 A1 | 3/2004 | Dorne et al. |
| 2004/0049509 A1 | 3/2004 | Keller et al. |
| 2004/0049580 A1 | 3/2004 | Boyd et al. |
| 2004/0054610 A1 | 3/2004 | Amstutz et al. |
| 2004/0064552 A1 | 4/2004 | Chong et al. |
| 2004/0068517 A1 | 4/2004 | Scott |
| 2004/0088199 A1 | 5/2004 | Childress et al. |
| 2004/0103014 A1 | 5/2004 | Teegan et al. |
| 2004/0117759 A1 | 6/2004 | Rippert, Jr. et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0139021 A1 | 7/2004 | Reed et al. |
| 2004/0145607 A1 | 7/2004 | Alderson |
| 2004/0147138 A1 | 7/2004 | Vaartstra |
| 2004/0148152 A1 | 7/2004 | Horikawa |
| 2004/0148586 A1 | 7/2004 | Gilboa |
| 2004/0162812 A1 | 8/2004 | Lane et al. |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0243587 A1 | 12/2004 | Nuyens et al. |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0027871 A1 | 2/2005 | Bradley et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0071211 A1 | 3/2005 | Flockhart et al. |
| 2005/0096959 A1 | 5/2005 | Kumar et al. |
| 2005/0104628 A1 | 5/2005 | Tanzawa et al. |
| 2005/0125683 A1 | 6/2005 | Matsuyama et al. |
| 2005/0132048 A1 | 6/2005 | Kogan et al. |
| 2005/0138162 A1 | 6/2005 | Byrnes |
| 2005/0144023 A1 | 6/2005 | Aboujaoude et al. |
| 2005/0165823 A1 | 7/2005 | Ondrusek et al. |
| 2005/0198021 A1 | 9/2005 | Wilcox et al. |
| 2005/0216235 A1 | 9/2005 | Butt et al. |
| 2005/0222889 A1 | 10/2005 | Lai et al. |
| 2005/0228875 A1 | 10/2005 | Monitzer et al. |
| 2005/0234882 A1 | 10/2005 | Bennett et al. |
| 2005/0267770 A1 | 12/2005 | Banavar et al. |
| 2005/0288920 A1 | 12/2005 | Green et al. |
| 2006/0004845 A1 | 1/2006 | Kristiansen et al. |
| 2006/0015388 A1 | 1/2006 | Flockhart et al. |
| 2006/0020783 A1 | 1/2006 | Fisher |
| 2006/0041861 A1 | 2/2006 | Trefler et al. |
| 2006/0053125 A1 | 3/2006 | Scott |
| 2006/0063138 A1 | 3/2006 | Loff et al. |
| 2006/0064486 A1 | 3/2006 | Baron et al. |
| 2006/0064667 A1 | 3/2006 | Freitas |
| 2006/0075360 A1 | 4/2006 | Bixler |
| 2006/0080082 A1 | 4/2006 | Ravindra et al. |
| 2006/0080401 A1 | 4/2006 | Gill et al. |
| 2006/0092467 A1 | 5/2006 | Dumitrescu et al. |
| 2006/0100847 A1 | 5/2006 | McEntee et al. |
| 2006/0101386 A1 | 5/2006 | Gerken et al. |
| 2006/0101393 A1 | 5/2006 | Gerken et al. |
| 2006/0106846 A1 | 5/2006 | Schulz et al. |
| 2006/0139312 A1 | 6/2006 | Sinclair et al. |
| 2006/0149751 A1 | 7/2006 | Jade et al. |
| 2006/0167655 A1 | 7/2006 | Barrow et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0209085 A1 | 9/2006 | Wong et al. |
| 2006/0218166 A1 | 9/2006 | Myers et al. |
| 2006/0271559 A1 | 11/2006 | Stavrakos et al. |
| 2006/0271920 A1 | 11/2006 | Abouelsaadat |
| 2006/0288348 A1 | 12/2006 | Kawamoto et al. |
| 2007/0005623 A1 | 1/2007 | Self et al. |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0100782 A1 | 5/2007 | Reed et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0143163 A1 | 6/2007 | Weiss et al. |
| 2007/0143851 A1 | 6/2007 | Nicodemus et al. |
| 2007/0203756 A1 | 8/2007 | Sears et al. |
| 2007/0208553 A1 | 9/2007 | Hastings et al. |
| 2007/0226031 A1 | 9/2007 | Manson et al. |
| 2007/0233902 A1 | 10/2007 | Trefler et al. |
| 2007/0239646 A1 | 10/2007 | Trefler |
| 2007/0245300 A1 | 10/2007 | Chan et al. |
| 2007/0260584 A1 | 11/2007 | Marti et al. |
| 2007/0294644 A1 | 12/2007 | Yost |
| 2008/0002823 A1 | 1/2008 | Fama et al. |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0109467 A1 | 5/2008 | Brookins et al. |
| 2008/0120593 A1 | 5/2008 | Keren et al. |
| 2008/0134088 A1 | 6/2008 | Tse et al. |
| 2008/0163253 A1 | 7/2008 | Massmann et al. |
| 2008/0184230 A1 | 7/2008 | Leech et al. |
| 2008/0189679 A1 | 8/2008 | Rodriguez et al. |
| 2008/0195377 A1 | 8/2008 | Kato et al. |
| 2008/0196003 A1 | 8/2008 | Gerken et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2008/0263510 A1 | 10/2008 | Nerome et al. |
| 2008/0297482 A1 | 12/2008 | Weiss |
| 2009/0007084 A1 | 1/2009 | Conallen et al. |
| 2009/0018998 A1 | 1/2009 | Patten, Jr. et al. |
| 2009/0075634 A1 | 3/2009 | Sinclair et al. |
| 2009/0083697 A1 | 3/2009 | Zhang et al. |

(56) References Cited

U.S. PATENT DOCUMENTS

| | | |
|---|---|---|
| 2009/0132232 A1 | 5/2009 | Trefler |
| 2009/0132996 A1 | 5/2009 | Eldridge et al. |
| 2009/0138844 A1 | 5/2009 | Halberstadt et al. |
| 2009/0150541 A1 | 6/2009 | Georgis |
| 2009/0158213 A1 | 6/2009 | Ryu |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0199123 A1 | 8/2009 | Albertson et al. |
| 2009/0228786 A1 | 9/2009 | Danton et al. |
| 2009/0271708 A1 | 10/2009 | Peters et al. |
| 2009/0276206 A1 | 11/2009 | Fitzpatrick et al. |
| 2009/0282384 A1 | 11/2009 | Keppler |
| 2009/0319948 A1 | 12/2009 | Stannard et al. |
| 2010/0011338 A1 | 1/2010 | Lewis |
| 2010/0083135 A1 | 4/2010 | Zawacki et al. |
| 2010/0088266 A1 | 4/2010 | Trefler |
| 2010/0107137 A1 | 4/2010 | Trefler et al. |
| 2010/0149109 A1 | 6/2010 | Elias |
| 2010/0217737 A1 | 8/2010 | Shama |
| 2011/0016422 A1 | 1/2011 | Miyazawa et al. |
| 2011/0066486 A1 | 3/2011 | Bassin et al. |
| 2011/0072373 A1 | 3/2011 | Yuki |
| 2011/0148791 A1 | 6/2011 | Luu |
| 2011/0214067 A1 | 9/2011 | Tanaka |
| 2011/0239113 A1 | 9/2011 | Hung et al. |
| 2011/0252305 A1 | 10/2011 | Tschani et al. |
| 2011/0264251 A1 | 10/2011 | Copello et al. |
| 2012/0041921 A1 | 2/2012 | Canaday et al. |
| 2012/0050530 A1 | 3/2012 | Raman et al. |
| 2012/0102420 A1* | 4/2012 | Fukahori ............... H04L 51/52 715/771 |
| 2012/0198367 A1 | 8/2012 | Bornheimer et al. |
| 2012/0272186 A1 | 10/2012 | Kraut |
| 2012/0290939 A1 | 11/2012 | Yu et al. |
| 2012/0293558 A1 | 11/2012 | Dilts |
| 2012/0306773 A1 | 12/2012 | Yeung |
| 2013/0007267 A1 | 1/2013 | Khatutsky |
| 2013/0031455 A1 | 1/2013 | Griffiths et al. |
| 2013/0047165 A1* | 2/2013 | Goetz .................. G06F 9/5027 719/318 |
| 2013/0067392 A1 | 3/2013 | Leonard et al. |
| 2013/0120319 A1 | 5/2013 | Givon |
| 2013/0120434 A1 | 5/2013 | Kim |
| 2013/0135294 A1* | 5/2013 | An ..................... G06F 3/04817 345/419 |
| 2013/0159904 A1 | 6/2013 | Kelappan et al. |
| 2013/0167245 A1 | 6/2013 | Birtwhistle et al. |
| 2013/0179816 A1 | 7/2013 | Seo et al. |
| 2013/0231970 A1 | 9/2013 | Trefler et al. |
| 2013/0254833 A1 | 9/2013 | Nicodemus et al. |
| 2013/0290249 A1 | 10/2013 | Merriman et al. |
| 2013/0335339 A1 | 12/2013 | Maunder |
| 2014/0019400 A1 | 1/2014 | Trefler et al. |
| 2014/0082539 A1 | 3/2014 | Tjissen |
| 2014/0089819 A1* | 3/2014 | Andler ................ G06F 3/04842 715/753 |
| 2014/0125577 A1 | 5/2014 | Hoang et al. |
| 2014/0137019 A1 | 5/2014 | Paulsen et al. |
| 2014/0258860 A1 | 9/2014 | Subramanian |
| 2014/0277164 A1 | 9/2014 | Ramsay et al. |
| 2014/0313135 A1 | 10/2014 | Pisters et al. |
| 2014/0325410 A1 | 10/2014 | Jung et al. |
| 2015/0058772 A1 | 2/2015 | Bator et al. |
| 2015/0074606 A1 | 3/2015 | Melen |
| 2015/0089406 A1 | 3/2015 | Trefler et al. |
| 2015/0127736 A1 | 5/2015 | Clinton et al. |
| 2016/0041961 A1 | 2/2016 | Romney |
| 2016/0062963 A1 | 3/2016 | Umapathy |
| 2016/0070560 A1 | 3/2016 | Chase |
| 2016/0085809 A1 | 3/2016 | de Castro Alves et al. |
| 2016/0098298 A1* | 4/2016 | Trefler ................. G06F 9/5027 718/104 |
| 2016/0105370 A1 | 4/2016 | Mellor et al. |
| 2016/0110055 A1* | 4/2016 | Sullivan ............. G06F 3/04812 715/771 |
| 2017/0013073 A1 | 1/2017 | Mendez et al. |
| 2017/0090685 A1* | 3/2017 | Lockwood ........... G06F 40/205 |
| 2017/0109032 A1 | 4/2017 | MeLinand et al. |
| 2017/0242582 A1 | 8/2017 | Yaremko |
| 2017/0255341 A1 | 9/2017 | Trefler et al. |
| 2017/0308556 A1* | 10/2017 | Gonzales-Brenes, Jr. .................. G06F 16/213 |
| 2017/0351425 A1 | 12/2017 | Dangelo et al. |
| 2017/0357703 A1 | 12/2017 | Theimer et al. |
| 2018/0011678 A1 | 1/2018 | Shipper et al. |
| 2018/0024901 A1* | 1/2018 | Tankersley ....... G06Q 10/06393 707/694 |
| 2018/0067580 A1 | 3/2018 | Bonnery et al. |

FOREIGN PATENT DOCUMENTS

| | | |
|---|---|---|
| EP | 1196882 A1 | 4/2002 |
| EP | 1203310 A1 | 5/2002 |
| EP | 1208482 A1 | 5/2002 |
| EP | 1212668 A2 | 6/2002 |
| EP | 1240592 A1 | 9/2002 |
| EP | 1277102 A2 | 1/2003 |
| EP | 1277119 A1 | 1/2003 |
| EP | 1277120 A1 | 1/2003 |
| EP | 1277153 A1 | 1/2003 |
| EP | 1277155 A1 | 1/2003 |
| EP | 1277329 A1 | 1/2003 |
| EP | 1374083 A1 | 1/2004 |
| EP | 1382030 A2 | 1/2004 |
| EP | 1386241 A1 | 2/2004 |
| EP | 1393172 A2 | 3/2004 |
| EP | 1393188 A1 | 3/2004 |
| EP | 1402336 A2 | 3/2004 |
| EP | 1407384 A1 | 4/2004 |
| EP | 1430396 A1 | 6/2004 |
| EP | 1438649 A1 | 7/2004 |
| EP | 1438654 A1 | 7/2004 |
| EP | 1438672 A1 | 7/2004 |
| EP | 1483685 A1 | 12/2004 |
| EP | 1490747 A1 | 12/2004 |
| EP | 1490809 A1 | 12/2004 |
| EP | 1492232 A1 | 12/2004 |
| EP | 1782183 A2 | 5/2007 |
| EP | 1830312 A1 | 9/2007 |
| EP | 1840803 A1 | 10/2007 |
| EP | 2115581 A1 | 11/2009 |
| WO | 9838564 A2 | 9/1998 |
| WO | 9840807 A2 | 9/1998 |
| WO | 9905632 A1 | 2/1999 |
| WO | 9945465 A1 | 9/1999 |
| WO | 9950784 A1 | 10/1999 |
| WO | 0033187 A1 | 6/2000 |
| WO | 0033217 A1 | 6/2000 |
| WO | 0033226 A1 | 6/2000 |
| WO | 0033235 A1 | 6/2000 |
| WO | 0033238 A2 | 6/2000 |
| WO | 0052553 A2 | 9/2000 |
| WO | 0052603 A2 | 9/2000 |
| WO | 0067194 A2 | 11/2000 |
| WO | 0140958 A1 | 6/2001 |
| WO | 0175610 A1 | 10/2001 |
| WO | 0175614 A1 | 10/2001 |
| WO | 0175747 A1 | 10/2001 |
| WO | 0175748 A1 | 10/2001 |
| WO | 0176206 A1 | 10/2001 |
| WO | 0177787 A2 | 10/2001 |
| WO | 0179994 A2 | 10/2001 |
| WO | 0219131 A1 | 3/2002 |
| WO | 0221254 A2 | 3/2002 |
| WO | 2002019131 | 3/2002 |
| WO | 0244947 A2 | 6/2002 |
| WO | 02056249 A2 | 7/2002 |
| WO | 02080006 A1 | 10/2002 |
| WO | 02080015 A1 | 10/2002 |
| WO | 02082300 A1 | 10/2002 |
| WO | 02084925 A2 | 10/2002 |
| WO | 02088869 A2 | 11/2002 |

(56) References Cited

FOREIGN PATENT DOCUMENTS

| | | | |
|---|---|---|---|
| WO | 02091346 A1 | 11/2002 | |
| WO | 02101517 A2 | 12/2002 | |
| WO | 02103576 A1 | 12/2002 | |
| WO | 03021393 A2 | 3/2003 | |
| WO | 03029923 A2 | 4/2003 | |
| WO | 03029955 A1 | 4/2003 | |
| WO | 03030005 A1 | 4/2003 | |
| WO | 03030013 A1 | 4/2003 | |
| WO | 03030014 A1 | 4/2003 | |
| WO | 03058504 A1 | 7/2003 | |
| WO | 03069500 A1 | 8/2003 | |
| WO | 03071380 A2 | 8/2003 | |
| WO | 03071388 A2 | 8/2003 | |
| WO | 03073319 A2 | 9/2003 | |
| WO | 03077139 A1 | 9/2003 | |
| WO | 03085503 A1 | 10/2003 | |
| WO | 03085580 A1 | 10/2003 | |
| WO | 2004001613 A1 | 12/2003 | |
| WO | 2004003684 A2 | 1/2004 | |
| WO | 2004003766 A1 | 1/2004 | |
| WO | 2004003885 A1 | 1/2004 | |
| WO | 2004046882 A2 | 6/2004 | |
| WO | 2004061815 A1 | 7/2004 | |
| WO | 2004086197 A2 | 10/2004 | |
| WO | 2004086198 A2 | 10/2004 | |
| WO | 2004095207 A2 | 11/2004 | |
| WO | 2004095208 A2 | 11/2004 | |
| WO | 2004114147 A1 | 12/2004 | |
| WO | 2005001627 A2 | 1/2005 | |
| WO | 2005003888 A2 | 1/2005 | |
| WO | 2005010645 A2 | 2/2005 | |
| WO | 2005117549 A2 | 12/2005 | |
| WO | 2006081536 A2 | 8/2006 | |
| WO | 2007033922 A2 | 3/2007 | |
| WO | 2008109441 A1 | 9/2008 | |
| WO | 2009097384 A1 | 8/2009 | |

OTHER PUBLICATIONS

Kuno, H.A., and E.A. Rundensteiner, Augmented Inherited MultiIndex Structure for Maintenance of Materialized Path Query Views, Proc. Sixth Int. Workshop on Research Issues in Data Engineering, pp. 128-137, Feb. 1996.
LaRue, J., Leveraging Integration and Workflow. Integrated Solutions, Accounting Today, SourceMedia, Aug. 2006, pp. 18-19.
Lippert, Eric, Fabulous Adventures in Coding: Metaprogrannning, Toast and the Future of Development Tools, Microsoft.com Blog, MSDN Home, published Mar. 4, 2004, 6 pgs.
Mandal, et al., Integrating existing scientific workflow systems: The kepler/pegasus example. USC Information Sciences Institute, 2007, 8 pages.
Manghi, Paolo, et. al., Hybrid Applications Over XML: Integrating the Procedural and Declarative Approaches, 2002 ACM, pp. 1-6. Retrieved Mar. 22, 2007.
Markiewicz, M.E., et al., Object oriented framework development ACM, 2001, 13 pages, http://dl.acm.org/citation.cfmid372771.
Markowitz, V.M., and A. Shoshani, Object Queries over Relational Databases: Language, Implementation, and Applications, IEEE Xplore, pp. 71-80, Apr. 1993.
Marmel, Elaine, Microsoft Office Project 2007 Bible, ISBN 0470009926, Wiley Publishing, Inc., 2007, 961 pages.
Maryanski, F., et al., The Data Model Compiler a Tool for Generating Object-Oriented Database Systems, 1986 Int. Workshop on Object-Oriented Database Systems, IEEE, 73-84 (1986).
McConnell, Steven C., Brooks Law Repealed, IEEE Software, pp. 6-9, Nov./Dec. 1999.
Mecca, G., et al., Cut and Paste, ACM, pp. 1-25 and Appendix I-IV (Jun. 1999). Retrieved Mar. 22, 2007.
Mitchell, T.M., Machine Learning, Chapter 3, 1997, McGraw-Hill, pp. 52-80.
Mitchell, T.M., Machine Learning, Chapter 6, 1997, McGraw-Hill, pp. 154-200.
Morizet-Mahoudeaux, P., A Hierarchy of Network-Based Knowledge Systems, IEEE Trans. on Systems, Man, and Cybernetics, vol. 21(5), pp. 1184-1191, Sep./Oct. 1991.
Pientka, B., et al., Progrannning with proofs and explicit contexts. International Symposium on Principles and Practice of Declarative Progrannning, ACM, 2008, pp. 163-173, http://delivery.acm.org/10.ll45/1390000/1389469/pl63-pientka.pdf.
Reinersten, Don, Is It Always a Bad Idea to Add Resources to a Late Project, Oct. 30, 2000. Electronic Design. vol. 48, Issue 22, p. 70.
Riccuiti, M., Oracle 8.0 on the way with objects: upgrade will also build in multidimensional engine. Info World. Sep. 25, 1995;17(39):16.
Richner, T., et al., Recovering high-level views of object-oriented applications from static and dynamic information. IEEE, 1999, 10 pages, http://ieeexploreieee.org/stamp/stamp.jsptp= arnumber= F792487.
Salvini, S., and M.H. Williams, Knowledge Management for Expert Systems, IEEE Colloquium on Knowledge Engineering, 3 pages, May 1990.
Schiefelbein, Mark, A Backbase Ajax Front-end for J2EE Applications, Internet Article, dev2dev http://dev2dev.bea.com/pt/a/433 , Aug. 29, 2005, 16 pages.
Sellis, T., et al., Coupling Production Systems and Database Systems: A Homogeneous Approach, IEEE Trans. on Knowledge and Data Engineering, vol. 5(2), pp. 240-256, Apr. 1993.
Shyy Y.M., and S.Y.W. Su, Refinement Preservation for Rule Selection in Active Object-Oriented Database Systems, Proc. Fourth Intl. Workshop on Research Issues in Data Engineering, pp. 115-123, Feb. 1994.
Singh, G., et al., Workflow task clustering for best effort systems with pegasus, Pegasus, 2008, 8 pages.
Smedley, T.J. et al., "Expanding the Utility of Spreadsheets Through the Integration of Visual Programming and User Interface Objects," School of Computer Science, Technical University of Nova Scotia, ACM, 1996; pp. 148-155.
Srinivasan, V., et al., Object persistence in object-oriented applications. IBM Systems Journal, 1997, vol. 36, issue 1, pp. 66-87, http://ieeexplore.ieee.org/stamp/stamp.jsptp= arnumber-5387186.
Stonebraker, M., The Integration of Rule Systems and Database Systems, IEEE Trans. on Knowledge and Data Engineering, vol. 4(5), pp. 415-423, Oct. 1992.
Sun, et al., "Supporting Inheritance in Relational Database Systems," IEEE, pp. 511-518, Jun. 1992.
Thuraisingham, "From Rules to Frames and Frames to Rules," AI Expert, pp. 31-39, Oct. 1989.
Vranes, S., et al., Integrating Multiple Paradigms within the Blackboard Framework, IEEE Transactions on Software Engineering, vol. 21, No. 3, Mar. 1995, pp. 244 262.
Yang, Bibo; Geunes, Joseph; OBrien, William J.; ResourceConstrained Project Scheduling: Past Work and New Directions, Apr. 2001, 28 pages, Research Report 2001-2006, Department of Industrial and Systems Engineering, University of Florida.
U.S. Appl. No. 15/613,439, filed Jun. 5, 2017, Connecting Graphical Shapes Using Gestures.
U.S. Appl. No. 15/206,956, filed Jul. 11, 2016, Selective Sharing for Collaborative Application Usage.
DeMichiel, LG., et al., Polyglot: Extensions to Relational Databases for Sharable Types and Functions in a Multi-Language Environment, Proc. Ninth Int. Conf. on Data Engineering, IEEE, pp. 651-660, Apr. 1993.
Devarakonda et al., Predictability of process resource usage: A measurement-based study on UNIX. IEEE Transactions on Software Engineering. 1989;15(12)1579-1586.
Communication for European Patent Application No. 05755530.2, dated Sep. 6, 2007 (2 pages).
European Search Report for Application No. 0575553 0.2, dated Mar. 26, 2012 (3 Pages).
European Office Action dated Aug. 31, 2012 for Application No. 05755530.2 (4 Pages).
Communication for European Patent Application No. 07250844.3 enclosing European Search Report, dated Jul. 11, 2007 (6 pages).

(56) References Cited

OTHER PUBLICATIONS

Communication for European Patent Application No. 07250844.3, dated Mar. 28, 2008 (1 page).
European Office Action dated Jul. 9, 2012 for Application No. 07250844.3 (8 Pages).
Communication for European Patent Application No. 07250848.4, dated Aug. 13, 2007 (EESR enclosed) (6 pages).
Communication for European Patent Application No. 07250848.4, dated May 29, 2008 (1 page).
Communication for European Patent Application No. 0873 1127.0, dated Oct. 13, 2009 (2 pages).
Extended European Search Report dated Oct. 29, 2012 for Application No. 08731127.0 (8 Pages).
Extended European Search Report for Application No. 151893 85.6, dated Dec. 17, 2015 (8 pages).
Fayad, M.E., et al., Object-oriented application frameworks. Communications of the ACM, Oct. 1997, vol. 40, issue 10, pp. 32-38, http://dl.acm.org/citation.cfmid=262798.
Francisco, S., et al. Rule-Based Web Page Generation, Proceedings of the 2nd Workshop on Adaptive Hypertext and Hypermedia, Hypertext98, Jun. 20-24, 1998, 9 pages.
Gajos et al. SUPPLE: Automatically Generating User Interfaces. IUI 2004, 8 pages.
Hague, Darren, Universal Worklist with SAP Netweaver Portal. Galileo Press, 2008, pp. 11-31. http://www.sap-hefte.de/download/dateien/14611146leseprobe.pdf.
International Search Report and Written Opinion for Application No. PCT/GB2004/000677, dated Aug. 2, 2004 (15 pages).
International Search Report for Application No. PCT/US2004/020783, dated Nov. 8, 2005 (2 pages).
International Preliminary Report on Patentability for Application No. PCT/US2004/020783, dated Feb. 13, 2006 (6 pages).
International Search Report for PCT/US05/018599, dated May 15, 2007 (1 page).
[NoAuthorListed] XPath Tutorial, Mar. 18, 2005, 7 pages (Year:2005).
Summons to Attend Oral Proceedings pursuant to rule 115(1) EPC, issued May 2, 2018 for Application No. 0873 1127.0 (8 pages).
U.S. Appl. No. 08/666,165, filed Jun. 19, 1996, Rules Bases and Methods of Access Thereof.
U.S. Appl. No. 10/430,693, filed May 6, 2003, Methods and Apparatus for Digital Data Processing With Mutable Inheritance.
U.S. Appl. No. 10/547,014, filed Aug. 25, 2005, Classification Using Probability Estimate Re-Sampling.
U.S. Appl. No. 10/639,735, filed Aug. 12, 2003, ProcessNiewer Interface.
U.S. Appl. No. 10/854,017, filed May 26, 2004, Integration of Declarative Rule-Based Processing With Procedural Programming.
U.S. Appl. No. 11/046,211, filed Jan. 28, 2005, Methods and Apparatus for Work Management and Routing.
U.S. Appl. No. 11/203,513, filed Aug. 12, 2005, Methods and Apparatus for Digital Data Processing With Mutable Inheritance.
U.S. Appl. No. 11/368,360, filed Mar. 3, 2006, Rules Base Systems and Methods With Circumstance Translation.
U.S. Appl. No. 11/396,415, filed Mar. 30, 2006, User Interface Methods and Apparatus for Rules Processing.
Eisenstein, et al., Adaptation in Automated User-Interface Design. IUI, 2000, pp. 74-81.
Simpson, Alan, et al., Access 97 for Windows 95/NT, 1997 SYBEX,16 pages, USPTO STIC-EIC 2100/2400.
Ceri, S., et al., WIDE—A distributed architecture for workflow management Proceedings. Seventh International Workshop on Research Issues in Data Engineering, IEEE, 1997, pp. 76-79, 1997.
Deelman, E., et al., Workflows and e-science: An overview of workflow system features and capabilities. Future Generation Computer Systems, May 2009, vol. 25, issue 5, pp. 528-540.
Kappel, G., et al., TriGSflow active object-oriented workflow management.Proceedings of the 28th Annual Hawaii International Conference on System Sciences. 1995, pp. 727-736.

Manolescu, D.A., et al., Dynamic object model and adaptive workflow. Proceedings of Metadata and Active Object-Model Pattern Mining Workshop co-located with OOPSLA, 1999, vol. 99, 19 pages.
Schulze, W., Fitting the workflow management facility into the object management architecture. Business Object Design and Implementation II. Springer London, 1998, pp. 109-117.
Surjanto, B., XML content management based on object-relational database technology. Proceedings of the First International Conference on Web Information Systems Engineering, IEEE, 2000, Jun. 19-21, 2000, vol. 1, pp. 70-79.
[No Author Listed] About the Integrated Work Manager (IWM). Pegasystems, Inc., Apr. 30, 2009, 3 pages, http://pdn-dev/DevNet/PRPCv5/KB/TMP9ad0lzumf.asp.
[No Author Listed] FreeBSD Project. "EDQUOTA(8)" in Free BSD System Managers Manual. FreeBSD 8.2 Jun. 6, 1993. pp. 1-2. Retrieved from freebsd.org on Oct. 27, 2011.
[No Author Listed] How SmartForms for Fair Blaze Advisor works,Fair Issac White Paper, http://www.FAIRISAAC.COM/, Oct. 31, 2005, 8 pages (website no longer active).
[No Author Listed] How to Configure and Customize the Universal Worklist. SAP Netweaver 04 and SAP Enterprise Portal 6.0. SAP AG. Version 1, May 2004, 65 pages. http://www.erpgenie.com/sap/netweaver/ep/Configuring%20the%20UWL.pdf.
[No Author Listed] How to configure the IWM/IAC gateway. Pegasystems, Inc., Apr. 30, 2009, 4 paegs, http://pdn-dev/DevNet/PRPCv5/KB/TMP9cf8fzurq4.asp.
[No Author Listed] How to install the Integrated Work Manager (IWM). Pegasystems, Inc., Apr. 30, 2009, 6 pages, http://pdn-dev/Dev N et/PRPCv5/KB/TMP9br 1 ezurp8 .asp.
[No Author Listed] HP Integrated Lights-Out 2, User Guide, Part No. 394326-004, HP, Aug. 2006, 189 pages.
[No Author Listed] Integrating with External Systems, PegaRULES Process Commander 5.2. Process Commander 5.2 reference. Pegasystems Inc, Cambridge, MA, 2006, 103 pages http:/ /pdn.pega.com/ProductSupport/Products/PegaRULESProcessCommander/documents/PRPCN5/502/iwes/PRPC52_Integrating_with_External_Systems.pdf.
[No Author Listed] IP Prior Art Database, Options when returning work items in workflow management systems. IBM, iPCOM000027980D, 2004, 3 pages.
[No Author Listed] IP Prior Art Database, Staff Queries and Assignments in Workflow Systems. IBM, iPCOM000142382D, 2006, 4 pages.
[No Author Listed] IP Prior Art Database, Using work items to manage user interactions with adaptive business services. IBM TDB, IPCOM000015953D, 2003, 4 pages.
[No Author Listed] Localizing an Application, PegaRULES Process Commander. Process Commander 4.2 reference. Pegasystems Inc., Cambdrige, MA, 2006, 92 pages http://pdn.pega.com/DevNet/PRPCv4/TechnologyPapers/documents/Localization0402.pdf.
[No Author Listed] Oracle Universal Work Queue: Implementation Guide. Release IIi for Windows NT. Oracle Corporation. Jul. 2001, 136 pages. http://docs.oracle.com/cd/A85964_01/acrobat/eul 15ug.pdf.
[No Author Listed] Solaris 9 resource manager software. A technical white paper. Sun Microsystems, Inc., Palo Alto CA, 2002, 37 pages. XP-002291080. Retrieved Aug. 3, 2004 from http://wwws.sun.corn/software/whitepapers/solaris9/srm.pdf.
Bertino, E., and P. Foscoli, Index Organizations for Object-Oriented Database Systems, IEEE Trans. on Knowledge and Data Engineering, 7(2): 193-209 (Apr. 1995).
Bierbaum, A., et al., VR juggler: A virtual platform for virtual reality application development. Proceedings of the Virtual Reality 2001 Conference, IEEE, 2001, 8 pages, http://ieeexplore.ieee.org/stamp/stamp.j sptp=Starnumber-913 77 4.
Breiman, L., Bagging predictors, Machine Learning, vol. 24, No. 2, Aug. 31, 1996, pp. 123-140, Kluwer Academic Publishers, Netherlands.
Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext98. pp 1-2.

(56) References Cited

OTHER PUBLICATIONS

Burleson, D., Adding behaviors to relational databases, DBMS, 8(10): 68(5) (Sep. 1995).
Busse, Ralph et al., Declarative and Procedural Object Oriented Views, IEEE, 1998, pp. 570-578, retrieved Mar. 22, 2007.
Buyya et al., Economic Models for Resource Management and Scheduling in Grid Computing, Concurrency and Computation: Practice and Experience, 2002, vol. 14, pp. 1507-1542. Chan, T.W., and W. Hwang, Towards Integrating Logic, Object, Frame, and Production, Proc. Fourth Int. Conf. on Software Engineering and Knowledge Engineering, IEEE, pp. 463-469, Jun. 1992.
Cheng, Cheng-Chung; Smith, Stephen F.; A Constraint Satisfaction Approach to Makespan Scheduling, ATPS 1996 Proceedings, pp. 45-52 (1996).
Cheng, C.C. and Smith, Applying Constraint Satisfaction Techniques to Job Shop Scheduling, Annals of Operations Research, 70: 327-357 (1997).
Cochrane, Roberta et al., Integrating Triggers and Declarative Constraints in SQL Database Systems, pp. 567-578, Proceedings of the 22nd VLDB Conference Mumbai (Bombay), India, 1996, retrieved Mar. 22, 2007.
Damerau, F.J., Problems and some solutions in customization of natural language database front ends. ACM Transactions on Information Systems, vol. 3, No. 2, Apr. 1, 1985, pp. 165-184.
Danforth, S., Integrating Object and Relational Technologies, Proc. Sixteenth Annual Int. Computer Software and Applications Conf., IEEE Comput. Soc. Press, pp. 225-226, Sep. 1992 (Abstract).
Deelman, E., et al., Pegasus: A framework for mapping complex scientific workflows onto distributed systems, submitted to Scientific Programming, Jan. 2005. Pre journal publication article, 22 pages.
Deelman, E., et al., Pegasus: A framework for mapping complex scientific workflows onto distributed systems. Scientific Programming, 13, pp. 219-237, 2005.
XPath Tutorial, Mar. 18, 2005, 7 pages (Year: 2005).
U.S. Appl. No. 11/681,269, filed Mar. 2, 2007, Proactive Performance Management for Multi-User Enterprise Software Systems.
U.S. Appl. No. 12/035,682, filed Feb. 22, 2008, User Interface Methods and Apparatus for Rules Processing.
U.S. Appl. No. 12/174,624, filed Jul. 16, 2008, Methods and Apparatus for Implementing Multilingual Software Applications.
U.S. Appl. No. 12/381,523, filed Mar. 12, 2009, Techniques for Dynamic Data Processing.
U.S. Appl. No. 12/386,959, filed Apr. 24, 2009, Method and Apparatus for Integrated Work Management.
U.S. Appl. No. 12/590,454, filed Nov. 6, 2009, Techniques for Content-Based Caching in a Computer System.
U.S. Appl. No. 12/619,215, filed Nov. 16, 2009, Rules Base Systems and Methods With Circumstance Translation.
U.S. Appl. No. 12/649,095, filed Dec. 29, 2009, Methods and Apparatus for Integration of Declarative Rule-Based Processing With Procedural Programming in a Digital Data-Processing Environment.
U.S. Appl. No. 12/798,161, filed Mar. 30, 2010, System and Method for Creation and Modification of Software Applications.
U.S. Appl. No. 13/031,097, filed Feb. 18, 2011, Systems and Methods for Distributed Rules Processing.
U.S. Appl. No. 13/031,109, filed Feb. 18, 2011, Rule-Based User Interface Conformance Methods.
U.S. Appl. No. 13/341,411, filed Dec. 30, 2011, System and Method for Updating or Modifying an Application Without Manual Coding.
U.S. Appl. No. 13/536,079, filed Jun. 28, 2012, Proactive Performance Management for Multi-User Enterprise Software Systems.
U.S. Appl. No. 13/718,255, filed Dec. 18, 2012, Methods and Apparatus for Work Management and Routing.
U.S. Appl. No. 13/892,956, filed May 13, 2013, Content-Based Caching Using a Content Identifier at a Point in Time.
U.S. Appl. No. 13/897,763, filed May 20, 2013, System and Software for Creation and Modification of Software.
U.S. Appl. No. 13/907,287, filed May 31, 2013, Methods and Apparatus for Integration of Declarative Rule-Based Processing With Procedural Programming in a Digital Data-Processing Environment.
U.S. Appl. No. 14/469,208, filed Aug. 26, 2014, Techniques for Dynamic Data Processing.
U.S. Appl. No. 14/527,348, filed Oct. 29, 2014, Systems and Methods for Distributed Rules Processing.
U.S. Appl. No. 14/558,084, filed Dec. 2, 2014, Methods and Apparatus for User Interface Optimization.
U.S. Appl. No. 14/597,207, filed Jan. 14, 2015, Methods and Apparatus for Integrated Work Management.
U.S. Appl. No. 14/928,085, filed Oct. 30, 2015, System and Method for Updating or Modifying an Application Without Manual Coding.
International Preliminary Report on Patentability for PCT/US2005/018599, dated Jun. 5, 2007 (10 pages).
International Search Report Written Opinion for PCT/US06/03160, dated Jul. 21, 2008 (16 pages).
International Preliminary Report on Patentability for PCT /US06/03160, dated Apr. 9, 2009 (14 pages).
International Search Report for PCT/US013/55503, dated Jul. 28, 2008 (1 page).
International Preliminary Report on Patentability for PCT/US2008/055503, dated Sep. 17, 2009 (4 pages).
International Search Report Written Opinion for PCT/US09/32341, dated Mar. 11, 2009 (14 pages).
International Preliminary Report on Patentability for PCT/US2009/032341, dated Aug. 12, 2010 (8 pages).
Johnson et al., Sharing and resuing rules—a feature comparison of five expert system shells. IEEE Expert, IEEE Services Center, New York, NY, vol. 9, No. 3, Jun. 1, 1994, pp. 3-17.
Jones et al., A user-centered approach to functions in excel. International Conference on Functional Programming, Uppsala, Jun. 30, 2003, pp. 1-12.
Kim, W., Object-Oriented Databases: Definition and Research Directions, IEEE Trans. on Knowledge and Data Engineering, vol. 2(3) pp. 327-341, Sep. 1990.
Kuhn, H.W., The Hungarian Method for the Assignment Problem, Naval Research Logistics Quarterly, 2 (1955), pp. 33-97.
Schiefelbein, Mark, A Backbase Ajax Front-end for J2EE Applications, Internet Article, dev2dev http://dev2dev.bea.com/lpt/a/433 , Aug. 29, 2005, 16 pages.

* cited by examiner

CUSTOMIZED DIGITAL CONTENT GENERATION SYSTEMS AND METHODS

BACKGROUND OF THE INVENTION

The invention pertains to digital data processing and, more particularly, to customized digital content generation. The invention has application, by way of example, in generating digital content based an ever-changing context of user interactions with an enterprise or other publisher of that content.

In order to generate and distribute digital content that will have impact on a target audience of users, a large enterprise generates millions of digital content pieces per campaign and distributes them at a rate of tens of thousand per minute or more. Achieving those rates and quantities requires a digital data processor. And, though those machines are fast, the rate and quantity at which the digital content pieces in the campaign must be generated destines a sizable portion of them to staleness.

By way of example, an email campaign targeting one million potential readers is typically launched and its substantive focus defined at least one to three days before the first digital content piece is generated and transmitted. By the time the one millionth piece has been sent, another day or two may have passed. Given the number of recipients and the length of time from launch to completion, its likely that five to ten percent of the content pieces that might otherwise have been relevant to their intended recipients have lost that by the time of receipt.

More concretely, such a campaign launched by an enterprise on a Monday and completed on a Thursday promoting air conditioners to potential customers in a metropolitan region in advance of a weekend heatwave would normally be expected to have a measurable impact—e.g., a click-through or response rate—on twenty to thirty thousand of those customers. During that four-day period, one thousand of those would-be responders are likely to have already purchased an air conditioner from the enterprise. For them, any email received as part of the campaign is wasted. In fact, it could be worse, if it offers better terms than the customers had gotten for their purchases.

And, of course, it is not just prior purchasers to whom the email campaign may be for naught: a myriad of other circumstances may change during the course of the campaign that renders it wasted as to another sizable segment of the target audience. The complexity is further magnified by the multitude of channels through which a modern-day campaign is effected, from social media (in all its forms) to email to snail mail, to name a few.

To be clear, it is not the fact of the email campaign that is, itself, problematic. It is the static nature of the content, which is typically determined days in advance of its actual final assembly, generation, and distribution. It is also the content delivery mechanism, which does not take into account the many alternate channels through which the modern-day enterprise reaches its audience.

The prior art has proposed various solutions to content generation, including Herman, U.S. Pat. No. 10,453,083, and Hyman, U.S. Pat. No. 10,601,751, neither of which hits the mark. These and other prior art solutions fail to suggest mechanisms for generating digital content that is both customized to the individual recipients to whom it is sent and that takes into account the ever-changing and last-minute circumstances of those recipients, particularly, vis-à-vis their interactions with the enterprise that publishes the content.

The problem is one very particular to computers: they are capable of—and, indeed necessary for—generating and distributing large quantities of digital content quickly; however, they lack the ability to adapt it to the ever-changing circumstances of the large numbers of recipients to whom it is distributed.

In view of the foregoing, an object of the invention is to provide improved digital data processing systems and methods.

A more particular object is to provide improved such systems and methods as are suited for customized digital content generation and distribution.

A still further object is to provide such improved systems and methods for digital content generation and distribution as take into account an ever-changing context of user interactions with the publisher of that content.

SUMMARY OF THE INVENTION

The foregoing are among the objects attained by the invention, which provides in some aspects a method, executed on a digital data processing system, of mass generation of customized digital content that includes continuously identifying current external events taken by or with respect to a plurality of respective prospective targets and, upon identification of such an event, generating a set of actions, each identifying a digital content piece and a digital delivery mechanism therefor. Each action is generated, according to the method, based on the current identified events for a particular prospective target and on a database of information about prior events taken by or with respect to him/her.

The sets of actions are queued upon generation and continuously retrieved on a first-in-first-out basis. And, upon retrieval from the queue, an action for generation of digital content customized for the respective prospective target is selected from the set based on quotas associated with that target and/or the delivery mechanism identified for it per the selected action. The digital data processing method further includes invoking, continuously and on selection of such an action, a content server to transmit the designated digital content piece to the respective prospective target via the delivery mechanism identified by that action.

Related aspects of the invention provide a digital data processing method, e.g., as described above, that includes ingesting incoming data streams, e.g., from any of the web, social media, call centers, transaction servers, and data warehouses, in order to identify the respective events. Those events, which occur asynchronously with respect to one another, can according to aspects of the invention, be identified substantially in real time with their respective occurrences. Other related aspects of the invention include memorializing the identified events in the aforesaid database.

Yet still other related aspects of the invention provide a digital data processing method, e.g., as described above, that includes generating identifiers of prospective targets on a round-robin basis from a list of known targets. This can be done continuously and concurrently, yet asynchronously, with respect to identifying current external events that may occur with respect to those perspective targets—though, according to some aspects of the invention, identifiers of targets for whom such events are detected are winnowed from among those generated from the list. Yet, like identifiers for prospective targets for whom external events are detected, the method includes generating sets of actions for prospective targets from identifiers generated round robin-style from the list.

Still further aspects of the invention provide digital data processing methods, e.g., as described above, comprising invoking one or more content servers based on the sets of actions to transmit 100,000 or more, 1,000,000 or more, or 10,000,000 or more, digital content pieces to different respective targets per day.

Yet other aspects of the invention provide digital data processing systems that generate custom digital content in accord with the methods above.

These and other aspects of the invention are evident in the drawings and in the text below.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Architecture

Figure 1:
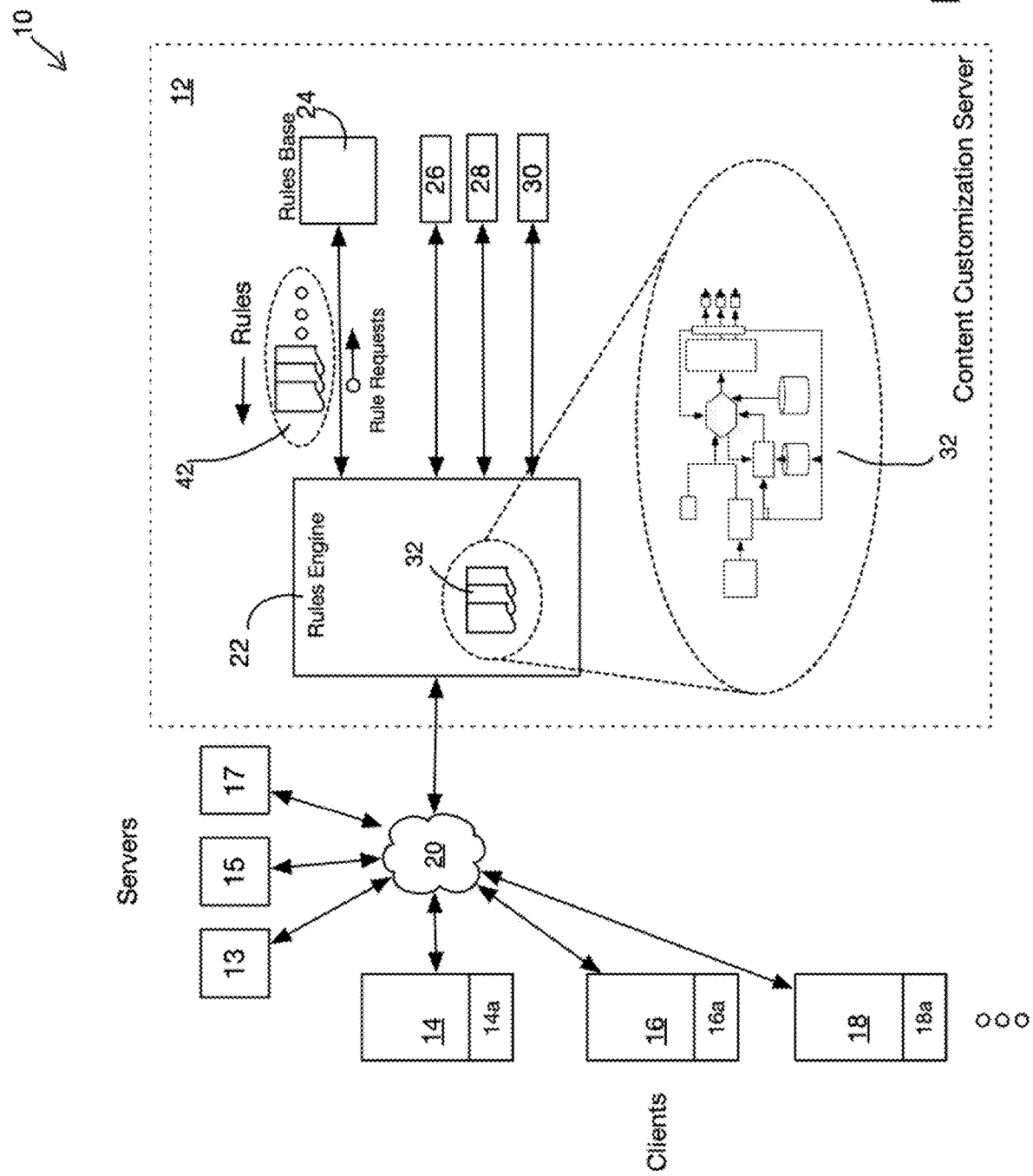
FIG. 1 depicts a digital data processing system of the type in which the invention operates.

FIG. 1 depicts a digital data processing system 10 according to the invention, as well as a system 10 in which the invention may be practiced. The system 10 includes a digital data device 12 for managing the generation of customized digital content (hereafter, alternatively "digital data processor 12", "server 12", "custom content server 12", or the like) that is coupled to one or more further server digital data devices 13, 15, 17, and to a plurality of client digital data processors, here, represented by elements 14, 16 and 18, via a network 20 comprising a combination of one or more of the Internet, a wide area network (WAN), virtual private network (VPN), metropolitan area network (MAN), local area network (LAN), telephone networks and/or a combination of these and other networks (wired, wireless, public, private or otherwise).

The illustrated client digital data devices 14, 16, 18 are conventional tablet computers, PDAs, mobile phones or other digital data apparatus (including, for example, desktop computers, workstations, minicomputers, and laptop computers) of the type commercially available in the marketplace and suitable for operation as client devices for the consumption of digital content by their respective users (not shown) in the conventional manner known in the art as adapted in accord with the teachings hereof. The devices 14, 16, 18 each comprise central processing, memory, storage and input/output units and other constituent components (not shown) of the type conventional in the art that cooperate to execute client applications 14a-18a, such as web browsers, client apps, and so forth, all of the type conventional in the art as adapted in accord with the teachings hereof, for purposes of receiving and responding to digital content pieces of the type transmitted from web servers, email servers, social media servers, e-commerce servers or otherwise.

Although client digital data processors 14, 16 18 are depicted and described in like manner here, it will be appreciated that this is for sake of generality and convenience: in other embodiments, these devices may differ in architecture and operation from that shown and described here and/or from each other, all consistent with the teachings hereof. And, although only three client devices 14, 16, 18 are shown in the drawing, in practice of the invention, there may be tens, hundreds, thousands, or millions of such devices, operated or operable by their respective users.

Like client digital data processors 14, 16, 18, server digital data processors 13, 15, 17 are digital data processing apparatus of the known in the art operating as web servers, email servers, social media servers, e-commerce servers or other digital content servers, all as adapted in accord with the teachings hereof. Though the servers 13, 15, 17 are typically implemented in a server-class computers, such as minicomputers, they may also be implemented in desktop computers, workstations, laptop computers, tablet computers, PDA or other suitable apparatus (again, as adapted in accord with the teachings hereof).

As above, although server digital data devices 13, 15, 17 are depicted and described in like manner here, it will be appreciated that this is for sake of generality and convenience: in other embodiments, these devices may differ in architecture and operation from that shown and described here and/or from each other, all consistent with the teachings hereof. And, although only three server devices 13, 15, 17 are shown in the drawing, in practice of the invention, there may be a greater or lesser number of such devices, operated or operable by their respective administrators.

Custom content server 12 is a digital data processing apparatus of the type commercially available in the marketplace suitable for operation in accord with the teachings hereof to create and drive custom content to client devices 14, 16, 18 via servers 13, 15, 17. Though the server 12 is typically implemented in a server-class computer, such as a minicomputer, it may also be implemented in a desktop computer, workstation, laptop computer, tablet computer, PDA or other suitable apparatus (again, as adapted in accord with the teachings hereof).

Like the other digital data processors 13-18 shown in the drawing, custom content server 12 of the illustrated embodiment comprises central processing, memory, storage and input/output units and other constituent components (not shown) of the type conventional in the art, here, in the case of server 12, configured in accord with the teachings hereof to form rules engine 22 and rules base 24, transaction database 26, language database 28 and context registry 30, one or more of which may be absent in various embodiments of the invention.

Although only a single server digital data processor 12 is depicted and described here, it will be appreciated that other embodiments may have greater or fewer numbers of these devices. Those other servers may differ in architecture and operation from that shown and described here and/or from each other, all consistent with the teachings hereof. Still further, although server 12 of the illustrated embodiment is depicted as being remotely disposed from the client digital data devices 14, 16, 18, and server digital data devices, 13, 15, 17, in other embodiments, server 12 may be co-housed and/or co-extensive with one or more of those other devices.

Rules base 24 comprises a conventional rules base of the type known in the art (albeit configured in accord with the teachings hereof) for storing digitally encoded rules 25 and other application-related information in tables, database records, database objects, and so forth. Such stored rules 25 are likewise formatted and stored in the conventional manner known in the art (albeit configured in accord with the teachings hereof).

Here, rules base 24 is configured and contains rules for use in business process management applications, though in other embodiments it may be configured and used for other applications. Such a rules base can be of the type described in the US patents and patent applications assigned to the assignee hereof, e.g., U.S. Pat. Nos. 5,826,250, 6,976,144, 7,665,063, 8,335,704, 7,711,919, 7,640,222, 8,250,525, US 20080208785, US 20090132232, U.S. Pat. Nos. 8,843,435, 8,479,157, 8,468,492, 8,880,487, 8,924,335, 9,189,361, US 20130231970, U.S. Pat. Nos. 9,678,719, 8,959,480, 9,270,743, US 20150127736, U.S. Pat. No. 9,658,735, US 20160098298, US 20170090685, US 20170255341, all by way of non-limiting example, the teachings of which are incorporated by reference herein; though, a rules base that is architected and/or operated differently may be used as well or in addition.

Although shown in the illustrated embodiment as part of server 12, rules base 24 (or other repository) may reside elsewhere, e.g., remote to server 12. Moreover, some embodiments may utilize multiple rules bases, e.g., an enterprise-wide rules base 24 on the server 12 and domain-specific rules bases on one or more of client devices 14, 16, 18, all by way of example. To the extent that multiple rules bases are provided in any given embodiment, they may be of like architecture and operation as one another; though, they may be disparate in these regards, as well. Utilization of multiple rules bases may be accomplished in the manner described in one or more of the above-cited incorporated-by-reference U.S. patents and patent applications, e.g., U.S. Pat. No. 8,924,335, entitled "Systems and Methods for Distributed Rules Processing," the teachings of which are incorporated heron by reference.

Transactional database 26 comprises a conventional database of the type known in the art (albeit configured in accord with the teachings hereof) for storing corporate, personal, governmental or other data that may be any of generated, stored, retrieved and otherwise processed (hereinafter, collectively referred to as "processed") by rules in rules base 24 and/or rules stored/executed elsewhere. The data may be financial data, customer records, personal data, run-time data related to an application, or other type of data and it may be stored in tables, database records, database objects, and so forth, all by way of non-limiting example.

As above, some embodiments may utilize multiple transactional databases, e.g., an enterprise-wide database 26 on the server 12 and branch-office specific databases on the client devices 14, 16, 18, all by way of example. To the extent that multiple transactional databases are provided in any given embodiment, they may be of like architecture and operation as one another; though, may they be disparate in these regards, as well. Utilization of multiple transactional databases may be accomplished in the manner described in incorporated-by-reference U.S. Pat. No. 8,924,335.

Language base 28 encodes information regarding the syntax of the language (or languages) in which user interfaces generated by server 12 are presented on devices 14-18 and, more particularly, in the illustrated embodiment, by applications 14a-18a. That syntax can include one or more of grammar, spelling, usage, punctuation, and/or style. The language base 28 may comprise a language database of the variety commercially available in the marketplace—e.g., in the manner of spelling and grammar dictionaries provided with conventional word processors (which "dictionaries" often include usage-, punctuation- and/or style-related entries). Alternatively, the language syntax information may be embodied in one or more rules 25 of the rules base 24, or otherwise.

Context registry 30 is a store that includes information related to the respective contexts or circumstances in which the requested user interfaces (e.g., web pages) are and/or will be communicated to and executed on the respective client devices 14-18. That context or circumstance can include, by way of non-limiting example, user "properties" or business attributes (e.g., access requirements, disability settings, market segment, behavioral segment, age, locale, and so forth), client device 14-18 properties (e.g., processor speed, display size, keyboard capabilities, locale, and so forth), communication channel properties (e.g., the speed and type of connection between server 12 and the respective client devices 14-18) and portal properties (e.g., download file size limits, quality-of-service requirements and so forth). That context or circumstance can further include, by way of non-limiting example, the language, country and/or other locale settings and preferences of the user of a device on which the web page is to be displayed. Still other variations in the possible range of values stored in the context registry 30 are possible.

Illustrated digital data processor 12 also includes rules engine 22 of the type conventionally known in the art (albeit configured in accord with the teachings hereof) for use in processing rules from a rules base in order to process data, e.g., in (and/or for storage to) a transactional database in view of a language base and/or context registry or other data sources described above, for example, in connection with events signaled to and/or detected by the engine. In the illustrated embodiment, the rules engine is of the type used for business process management applications, though in other embodiments it may be of the type used for other applications. Preferred such rules engines are of the type described in the aforementioned incorporated-by-reference U.S. Pat. No. 5,826,250, entitled "Rules Bases and Methods of Access Thereof" and U.S. Pat. No. 7,640,222, entitled "Rules Base Systems and Methods with Circumstance Translation" and/or U.S. Pat. No. 8,250,525, entitled "Proactive Performance Management For Multi-User Enterprise Software Systems," by way of example, the teachings too of which are incorporated by reference herein-all as adapted in accord with the teachings hereof.

The rules engine 22 may be implemented in a single software program or module, or a combination of multiple software modules/programs. Moreover, it may comprise programming instructions, scripts, rules (e.g., rules stored in rules base 24) and/or a combination thereof. And, even though the rules engine 22 of the illustrated embodiment is depicted as executing on just server digital data processor 12, in other embodiments, the engine 22 may execute on or across multiple digital data processors (e.g., 12, 14, 16 and 18). Executing the engine 22 over multiple digital data processors may be accomplished in the manner described in incorporated-by-reference U.S. Pat. No. 8,924,335, by way of non-limiting example.

Custom Content Generation

Described below is a method of operating system 10 and, particularly, server 12 and still more particularly, by way of example, rules engine 22, to execute a procedure 32 to generate digital content pieces customized for delivery to clients devices 14, 16, 18 via servers 13, 15, 17. This may be, for example, at the request of an administrator of device 12 issued via an browser interface (not shown) or a dedicated application (not shown) executing on that device or otherwise; conversely, such invocation of the method may be effected sans operator request, e.g., upon boot-up of server 12 or otherwise, all as per convention in the art as adapted in accord with the teachings hereof.

Figure 2:
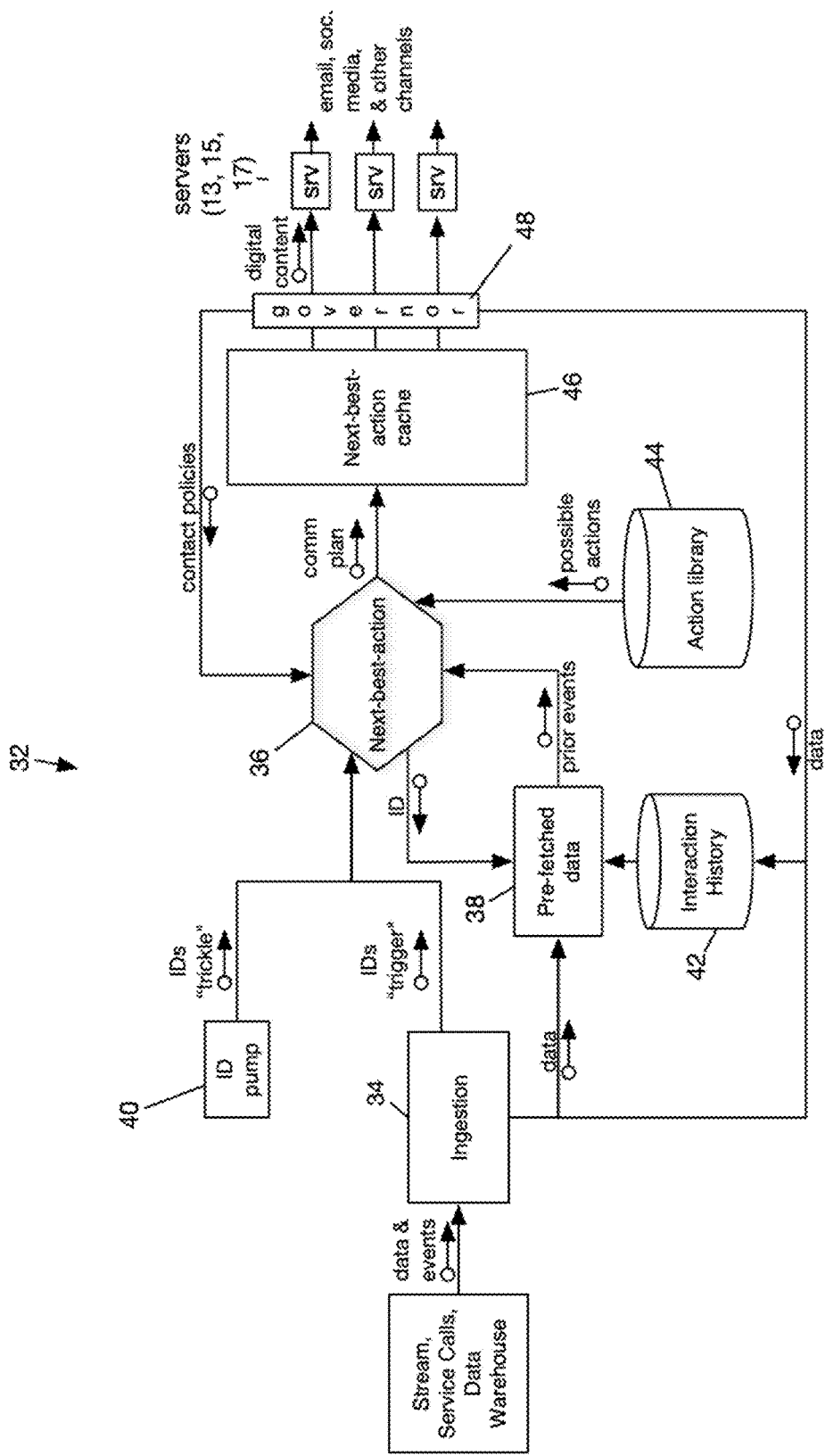
FIG. 2 depicts a procedure executing within the system of FIG. 1 for generation of custom digital content.

FIG. 2 depicts a procedure 32 for generation of custom digital content according to one practice of the invention.

The procedure is depicted by way of code blocks, each associated with one or more steps of the procedure, as described below. In practice, each of those blocks—which are referred to as "steps" in the discussion that follows—may be implemented by informal or formal groupings of rules and/or code, whether organized in objects, functions, subroutines or other programming constructs, that execute within rules engine 22 or other software execution environment, all as is within the ken of those skilled in the art in view of the teachings hereof. It will be appreciated that the association between steps of the procedure 32 and blocks of FIG. 2 is for purposes of illustration and that, in practice, the specific association between those steps and the objects, functions, subroutines or other constructs that implement them may vary from that shown here and described below, all without deviating from the scope of the invention. Moreover, though, in the illustrated embodiment, the procedure 32 executes within the engine 22 or other environment on server 12, in other embodiments, one or more steps of the procedure 32 may be executed on other devices, e.g., servers 13, 15, 17, again, as is within the ken of those skilled in the art in view of the teachings hereof.

Event Ingestion

Referring to the drawing, in step 34 the illustrated procedure 32 continuously ingests data from external data stores, streams, and otherwise, in order to identify current external events taken by or with respect to prospective targets of customized digital content pieces.

In the illustrated embodiment, the targets are individuals that receive digital content by way of client devices 14, 16, 18 and, more specifically, by way of apps 14a, 16a, 18a executing respectively thereon. Other embodiment may vary in these regards. Thus, for example, the targets may be businesses or other entities capable of receiving such content by way of such devices. In still other embodiments, the targets may be digital billboards, interactive voice response systems (IVRs), private or public broadcast systems, and/or other "things" capable of receiving digital content, e.g., for display or other presentation.

Digital content pieces may be emails, text messages, tweets, web pages, data files, digital robocalls or ringless voicemail, video or audio messages, or other digital content amenable to customization suitable for delivery to the devices 14, 16, 18 via servers 12, 13, 15, 17 in accord with the teachings hereof. Customization, as used here, refers to customization in terms of content (e.g., modification of words, images or other portions of a content piece), selection (e.g., as between multiple pre-existing content pieces), and/or delivery mechanism (e.g., email vs text message, web page vs data file, etc., all by way of nonlimiting example).

External events, as used here, refer to actions taken by the prospective targets or with respect to those targets. Events taken by and with respect to targets can include, by way of example, emails, tweets or social network postings by them—or ones directed to them. They can also include purchases (e.g., of products, properties or otherwise), dispositions (by way of sales, legal proceedings, or otherwise), life events (births, deaths, weddings, and so forth), all by way of example.

External events ingested in step 34 of the illustrated embodiment include only those that occur outside the context of the procedure 32. Thus, for example, generation and transmission to a target of a piece of customized digital content by the procedure 32 does not constitute an event that is ingested in step 34 and does not, in and of itself, trigger generation of a next piece of content (although, when an external event does subsequently occur with respect to that target, the fact of transmission of the prior piece of content may inform customization of the next piece of content generated and transmitted to him/her/it).

In step 34 of the illustrated embodiment, the procedure 32 identifies events concerning prospective targets from external data stores, streams and otherwise. The data stores can be public or private databases or other data repositories, including, for example, data warehouses. These can include transactional databases (e.g., reflecting service calls, communications or other interactions with a call center, purchases, and other events), databases of public records and so forth, all by way of non-limiting example. Streams can be social media feeds, web feeds, mobile app feeds, email feeds or other sources of information and other postings by or about (e.g., with respect to) the potential targets. In the discussion that follows, the sources of information regarding external events, are referred to for simplicity as "data stores and streams," regardless of actual source. Accessing such data stores and streams is within the ken of those skilled in the art in view of the teachings hereof. Ingestion of those stores and streams to identify events can be by way of natural language processing, parsing, scraping and other knowledge discovery techniques, each selected in accord with the particular data store and/or stream from which events are to be identified—all as is within the ken of those skilled in the art in view of the teachings hereof.

In some embodiments, the target of every external event identified in step 34 is deemed a prospective target for purposes hereof and the event is processed accordingly. In the illustrated embodiment, however, only those events that concern previously known targets are processed—or, put another way, ingestion step 34 of the illustrated embodiment includes winnowing from the external data stores, streams and otherwise, events by or with respect to persons, business and/or other things not already included in a potential target database (not shown) or otherwise. By way of non-limiting example, the potential targets database of a business enterprise can be a database of customers and potential customers. Implementation of step 34, whether processing events to identify prospective targets or processing only those concerning already known such targets, is within the ken of those skilled in the art in view of the teachings hereof.

Step 34 of the illustrated embodiment is executed continuously—that is, not in a batch mode. Put another way, it processes, parses, scrapes and otherwise discovers information contained in data stores and streams with such frequency as to identify events in those stores and streams—events which, for the most part, occur asynchronously with respect to one another—substantially in real time with their respective occurrences. Of course, for events that do not occur, in the first instance, in such store or stream, this is real time with respect to the occurrence of their memorializations in such stores or streams. This enables the downstream steps of procedure 32 to customize digital content for the prospective targets to whom those events in real time and, thereby, ensure that content is relevant to those targets.

As shown in the drawing, processing by step 34 of the illustrated embodiment produces a list of IDs of prospective targets, as well as a data records reflecting the events discerned with respect to them during ingestion step 34. The former are referred to as "trigger" IDs in the drawing. They can be generated, on the fly, e.g., by hashing or otherwise—though, in the illustrated embodiment, the IDs of those potential targets are assigned based on those for the same respective persons, businesses or other targets, in a pre-existing known customer database or other data store of known prospective targets (not shown). Data records generated in step 34 can encode the identified external events (along with the respective prospective target ID) in any conventional manner known in the art as adapted in accord with the teachings hereof. IDs generated by step 34 are processed in the next-best-action step 36 discussed below, while the data records generated in step 34 reflecting current external events are passed to a pre-fetch data store 38 and memorialized there.

Trickling

In step 40, the illustrated procedure 32 generates IDs of prospective targets on a round-robin basis from among a list of identifiers of known respective prospective targets—e.g., from the aforesaid customer database or other data store of known prospective targets. This is done concurrently with step 34, though, it need not be synchronous with it.

As with step 34, step 40 is executed continuously (i.e., not in batch mode), albeit at a rate (e.g., in terms of IDs per hour, per day or so forth) paced to cycle through the IDs of all such known respective targets once per desired contact interval. The latter is the desired average period of time over which the operator of procedure 32 considers communicating to or to receive communication from the average prospective target. Thus, for example, if the operator considers communicating to/from the average target once per day, the step 40 is executed at a rate paced to cycle through IDs of all respective targets once per day. Of course, the desired contact interval will vary from embodiment to embodiment, as is within the ken of those skilled in the art in view of the teachings hereof.

This round-robin "trickling" of IDs, as this operation of step 40 is referred to in the drawing and elsewhere herein, is within the ken of those skilled in the art in view of the teachings hereof. In the illustrated embodiment, step 40 includes winnowing from the list of generated IDs those of respective prospective targets for whom a current external event has been identified in step 34 within the same desired contact interval.

Just as with IDs generated in step 34, those generated in step 40 are passed to next-best-action step 36 for processing by it.

Event History

The generation of custom digital content by illustrated procedure 32 is a function of the history of events with respect to each target. This can include current external events identified for those targets in step 34 and maintained in pre-fetch store 38. It can also include a prior history of external events for those targets maintained in database 42, labelled, "interaction history," whether rolled over from the pre-fetch store 38 into database 42 or gathered in that database in the first instance from transactional database 26, data warehouses, or streams or other sources, e.g., using natural language processing, parsing, scraping and other knowledge discovery techniques, e.g., as discussed above in connection with step 34, or otherwise. In the illustrated embodiment, that history also includes "internal" events—to wit, data records regarding custom digital data content transmitted to the targets, e.g., in step 48.

Events can be stored in database 42 in a conventional manner known in the art, as adapted in accord with the teachings hereof. This can be by array, linked list or other data structures a maintained on server 12 or otherwise; although, in the illustrated embodiment, database 42 comprises a relational database under management (e.g., for purposes of data retrieval) of a relational database management system that forms part of the server 12 middleware (not shown). Other embodiments may vary in these regards, e.g., storing the event histories in online databases, non-relational, or otherwise, all as is within the ken of those skilled in the art in view of the teachings hereof.

Data store 38 serves as a cache for database 42 and, through the action of rules 25 or other programming instructions that work with store 38, prefetching from that database 42 and holding for more rapid access during next-best-action step 36 event data for respective targets that are about to be processed during that step 36. This can include current external event data identified for those targets in step 34 and both prior internal and external event data for those targets retrieved from the database 42 upon generation of target IDs in steps 34 and 40. In some embodiments, those target IDs are passed directly to those rules/instructions in connection with execution of steps 34, 40; in other embodiments, they are passed in connection with execution of step 36. Specifics of which such prior internal/external event data to retrieve is implementation specific and, more particularly, dependent on factors evaluated in next-best-action step 36 in determining and generating sets of actions for those targets, as discussed below. Implementation of the data store 38 and rules/instructions for pre-fetching event data for caching therein—including the use of arrays, linked lists or other data structures to store the prefetched event data—is within the ken of those skilled in the art in view of the teachings hereof.

Next Best Action Generation

In step 36, the illustrated procedure 32 generates sets of one or more actions for each respective prospective target whose ID is generated in steps 34 and 40. The step 36, which operates continuously (i.e., not in batch mode), generates those respective sets upon receipt of output from steps 34 and/or 40. In addition, in some embodiments, step 36 can generate such sets (thereby forcing update of the cache 46, as discussed below) whenever there is a change, e.g., in transactional database 36 regarding in demographic or other characteristics of a prospective target, when a target-specific watchdog timer fires (e.g., indicating that it is a target's birthday or that no activity has occurred vis-à-vis the target in a designated period, e.g., 30 days, or otherwise). Moreover, the step 36 of some embodiments can additionally be invoked to generate such a set whenever a special piece of digital content—e.g., an emergency message—must be generated for and sent to a target.

Each action in those sets identifies a digital content piece to be transmitted to the respective target and a delivery mechanism by which to transmit it. The illustrated embodiment generates three actions for each set (or communication plan—referred to as "comm plan" in the drawing), though, other embodiments may vary in this regard. Moreover, because each action is dependent upon the current and prior history of events of the respective prospective target, the actions in the plan for one such target are likely to differ from those for another.

Thus, for example, in an implementation that sets an upper limit of two on the number of actions in each communication plan, those for a first prospective target for whom an event was recently identified in step 34 might include a first action identifying a digital banner ad for display upon the target's next visit to a designate URL and a second action identifying an SMS to send to the target's phone number; whereas actions for a second prospective target who has no history of web visits and for whom no SMS phone number is known might include first and second actions each of which identify a different respective digital advertisement to send to that target's email address.

Step 36 of the illustrated embodiment executes a next-best-action algorithm of the type known in the art to generate each action in a communication plan for a given prospective target, though, other embodiments may use other algorithms or methodologies for plan determination. Depending upon the implementation of that algorithm in a given instance, determination of what actions—i.e., what digital content pieces and respective delivery mechanisms—are generated by the algorithm is a function of current external event data identified for that target, if any, in step 34 and both prior internal and external event data for that target retrieved from database 42 into prefetch data store 38, as discussed above. It can also be dependent on demographic and other characteristics of the target, e.g., as prefetched to store 38 from interaction history database 42, transactional database 26 or otherwise, all as is within the ken of those skilled in the art in view of the teachings hereof.

It will thus be appreciated that, because each target has a different current and prior event history, the algorithm generates different action recommendations—and, therefore, communication plans—for each target. Moreover, depending on the nature of the next-best-action algorithm utilized in a given embodiment, those recommendations can pertain solely to selection of pre-existing content pieces (e.g., from a database 44 of digital content pieces and other potential actions) and/or modification of such content pieces, e.g., with varied pricing, images, discounts, and so forth. They can also pertain to selection of alternate delivery mechanisms, e.g., as where the prior event history of a given prospective target augurs in favor of, say, email over text messaging, by way of non-limiting example.

As noted above, in the illustrated embodiment, multiple actions are generated for each communication plan. To effect this, the method of step 36 utilizes the next-best-action (or other) algorithm to generate multiple recommendations and, based on probability estimates, or other estimated success values assigned to those recommendations by the algorithm or otherwise, stores them in priority order in linked lists, arrays or other data structures employed by the method to encode those plans for storage in cache 46. In some embodiments, a communication plan is a list of records containing the following fields:

TargetID
Priority—importance of the message compared to other messages
Value—value of the message
ActionID
TreatmentID
Destination (Email, Branch, Call-Center, . . . )
TimeToCommunicate
Personalized Message Implementation of the next-best-action step 36, as described above, including encoding the actions generated by it into communication plans, is within the ken of those skilled in the art in view of the teachings hereof.

Next Best Action Plan Queuing

Each set of actions, or communication plans, generated in step 36 and including the ID of the respective target (as well, of course, of the action(s) that make up the plan) is queued to next-best-action cache 46 at the conclusion of step 36. Queuing can be performed as part of step 36 and/or by through the action of rules 25 or other programming instructions associated with cache 46. Regardless, the queuing is done continuously (i.e., not as part of a batch mode process) as each communication plan is generated in step 36. Moreover, the queuing of the illustrated embodiment is on a FIFO (first in, first out) basis, thereby, better insuring that the communication plans generated for prospective targets will be carried out, e.g., in step 48, closer in real time vis-à-vis the events that triggered creation of those plans in the first instance per steps 34-36.

Notwithstanding FIFO queuing, the cache maintains no more than one plan per prospective target—even if multiple events ingested for a given target in step 34 and/or if action of steps 34 and 40 result in generation of multiple plans for that target in step 36. To this end, when a plan is queued to the cache 46 (whether by rules/code implementing step 36 or otherwise) any prior plans currently in that cache for the same target are removed. This can be done through a brute-force search of the queue with the target ID in a newly generated plan, though, preferably, a hash of such IDs or other index-based search within the ken of those skilled in the art is used to speed the search and replacement.

Implementation of the FIFO cache 46 in a manner that supports the searching for and replacement plans for the same target, whether via arrays, linked lists or other structures, is within the ken of those skilled in the art in view of the teachings hereof.

Executing Action Plans (Alternative 1—Pushing Plans to Servers for Execution)

In step 48 (labelled "governor" in the drawing), the illustrated procedure 32 retrieves and acts on action plans in the cache 46. This is done continuously (i.e., not on a batch mode basis) and on a FIFO basis as discussed above.

To that end, in step 48 the illustrated procedure 32 retrieves a next communication plan from the cache 46 and unpacks the one or more actions contained within it. In the illustrated embodiment, these are typically provided in an ordered priority determined in the next-best-action step 36, as discussed above.

The method of step 48 selects the most highly recommended of those actions and determines whether it can be carried out—and, specifically, whether the digital content piece identified in that action is available (if not, itself, encoded in the plan), whether a server necessary to deliver that content piece via the delivery mechanism identified in the plan is available, and whether delivery of that content piece by that delivery plan (and server) to the target identified by the action at the time of execution of step 48 on that action would violate quotas (e.g., contact policies, action constraints and/or treatment constraints) associated with that target and/or that delivery plan. A pseudo-code example showing how such a quota violation determination can be made is provided below in connection with the alternate embodiment.

Those quotas (or policies), which may be hard-coded into the rules/code that implements step 48 but which, preferably, are maintained in a database or other data set accessible to those rules/code, are of the type known in the art establishing numerical, rate, time/date or other limits on content transmissions. By way of non-limiting example, such a policy can define numerical daily or weekly limits on the number of text messages to non-corporate targets; another could restrict usage of a given delivery mechanism on a per-period or time-of-day basis; and so forth, all as within the ken of those skilled in the art in view of the teachings hereof. In the illustrated embodiment, the quotas (or policies) are be shared with the next-best-action step 36, as indicated in the drawing.

Instead of or in addition to those associated with targets and/or delivery plans, other embodiments may utilize quotas associated with digital content pieces (e.g., limiting the number of times a given content piece can be transmitted) or otherwise, again, as is within the ken of those skilled in the art in view of the teachings hereof. On the other hand, in some embodiments, quotas are not invoked for certain actions or action plans—to wit, those including special pieces of digital content—e.g., an emergency message.

If the method of step 48 determines that the selected action in the communication plan can be carried out and would not violate quotas, it "pushes" that plan for execution. More specifically, the method invokes a server 13, 15, 17 appropriate for the delivery mechanism identified in the selected action, passing to it the digital content piece identified in that action for digital transmission to the target's client device 14, 16, 18. This, too, is done continuously (i.e., not on a batch basis) to better insure delivery of the content piece while it remains relevant. At the same time, step 48 memorializes transmittal of that content piece by that mechanism to database 42. In the illustrated embodiment, step 48 also memorializes the event to the pre-fetch store 38.

On the other hand, if the selected action from the communication cannot be carried out, e.g., because of lack of availability of the content, a server or violation of a quota, the method of claim 48 selects the next most highly recommended action for the prospective target from the action plan retrieved from FIFO 46.

Executing Action Plans (Alternative 2—Permitting Servers to Pull Plans for Execution)

In other embodiments, step 48 of the illustrated procedure 32 permits a server 13, 15, 17 to request (or "pull") a list of actions destined for it for one or more prospective targets and, thereby, to execute those actions when any of those targets next interacts with the server. For servers, like web servers, for which interactions demand real-time response, this minimizes the risk that interaction with any given prospective target will occur before the next best action for that target is executed.

According to this alternative embodiment, step 48 retrieves and acts on action plans in the cache 46 along the lines described above, as modified by the steps below:

In response to a request from a server, the method of step 48 pulls a set of n prioritized actions for a particular delivery mechanism (or server 13, 15, 17) by executing a request in the following form on the cache 46
Call pull(destID, n)→set of n highest priority actions or less if there are no actions available:
Select * from Cache where DestinationID=destID and TimeToCommunicate<=now( ) ordered by priority desc limit n;
The subsequent ResultSet is checked in step 48 to insure it abides by:
Contact policies (e.g., table of customerID×DestinationID with counts for a rolling time window (e.g., last 30 days))
Action constraints (e.g., table of ActionID×DestinationID with counts for a rolling time window (e.g., This action can only be sent via email 100,000 times per day))
Treatment constraints (e.g., table of TreatmentID with counts for a rolling time window (a constraint on a particular variation of an action, e.g., a limit of 500 per day on the direct mailing variant of an action to send cash-off coupons to customers who recently opened credit accounts))
In the discussion immediately above:
Counts can be replaced by values to meet budget constraints. (10,000 possible responses)
When an action does not pass a constraint, it's skipped. If there are fewer than 'n' actions left, a new query is executed against the cache 46.

The result-set is returned to the requesting server, and every prospective target in this set is submitted for re-evaluation, e.g., by sending their respective target ID's to the next-best-action step 36, thereby, triggering generation of a further action plan for each.

Throughput

Illustrated system 10 can be operated so as to generate at transmit 100,000 or more digital content pieces per day and, more preferably, 1,000,000 or more such digital content pieces per day, still more preferably over 10,000,000 such pieces per day. Execution of the procedure 32 and its constituent steps as discussed above to achieve such rates is within the ken of those skilled in the art in view of the teachings above.

Conclusion

Systems and methods according to the invention achieve the desired objects, among others. It will be appreciated that the embodiments shown in the drawings and discussed in the text above are merely examples of the invention and that other embodiments, incorporating changes thereto within the ken of those skilled in the art, fall within the scope of the invention.

What we claim is:

1. A method of mass generation of customized digital content, comprising executing on a digital data processing system steps of:
A. identifying, continuously, current external events taken by or with respect to a plurality of respective prospective targets of customized digital content pieces, where each external event is one taken (i) by the respective prospective target, or (ii) with respect to that prospective target other than as part of this method of customized digital content generation,
B. generating, continuously and upon identification of a current event taken with respect to a said respective prospective target, a set of one or more actions, each identifying a digital content piece and a digital delivery mechanism therefor, where each such action is generated based on (i) one or more current external events identified in step (A) for the respective prospective target, and (ii) any of prior information about, and events taken by or with respect to, that respective prospective target as reflected in a database of information and prior events (the "database"),
C. queuing to a digital cache each set of actions continuously and upon its generation in step (B),
D. retrieving, continuously and on a first-in-first-out basis, sets queued to the digital cache, and selecting, continuously and upon retrieval of each such set, an action for generation of digital content customized for the respective prospective target of that action, where the action is selected from the set of one or more actions based on quotas associated with (i) that prospective target and (ii) the delivery mechanism identified with that action,
E. invoking, continuously and on selection of a said action in step (D), a content server for the delivery mechanism identified with that selected action to transmit to the respective prospective target the digital content piece identified with that selected action,
F. responding to a request by a content server associated with a said delivery mechanism by
i) pulling a set of n prioritized actions for that said delivery mechanism, where the pulling step includes executing a request in the following form on the digital cache
call pull(destID, n)→set of n highest priority actions or less if there are no actions available:

```
    select * from Cache where DestinationID=destID
        and TimeToCommunicate<=now( ) ordered by
        priority desc limit n,
    where destID and DestinationID are an identification
        associated with that said delivery mechanism, and
        TimeToCommunicate is a time-based parameter,
    ii) transmitting the set of prioritized actions to the
        requesting content server, and
G. responding, with the requesting content server, to
    interaction between the associated said delivery mecha-
    nism and a prospective target by executing a said action
    generated for that prospective target in the set of
    prioritized actions in order to generate digital content
    therefor.
```

2. The method of claim 1, wherein the step of identifying current external events includes ingesting one or more incoming streams of events.

3. The method of claim 2, wherein the step of ingesting streams of event includes ingesting streams from any of the web, social media, call centers, transaction servers, and data warehouses.

4. The method of claim 1, wherein the current external events occur asynchronously with respect to one another.

5. The method of claim 1, wherein the step of identifying current external events includes identifying those events substantially in real time with their respective occurrences.

6. The method of claim 1, wherein the step of identifying current external events includes memorializing said external events to the database.

7. The method of claim 1, comprising generating, continuously and concurrently with the step of identifying current external events, identifiers of respective prospective targets, where those identifiers are generated on a round-robin basis from among a list of identifiers of known respective prospective targets.

8. The method of claim 7, wherein the step of generating identifiers of respective prospective targets includes winnowing from the list of identifiers of known respective prospective targets those targets for whom a current external event has been identified.

9. The method of claim 7, wherein the step of generating identifiers includes generating identifiers of respective prospective targets asynchronously with respect to Identification of current external events with respect to those respective prospective targets.

10. The method of claim 7, wherein step (B) includes generating, continuously and upon generation of an identifier of a respective prospective target, a set of one or more actions based on prior information about, and events taken by or with respect to, that respective prospective target as reflected in the database.

11. The method of claim 1, comprising invoking one or more said content servers to transmit over 100,000 digital content pieces to different respective targets per day.

12. The method of claim 11, comprising invoking one or more said content servers to transmit over 1,000,000 digital content pieces to different respective targets per day.

13. The method of claim 12, comprising invoking one or more content servers to transmit over 10,000,000 digital content pieces to different respective targets per day.

14. The method of claim 1, comprising
    memorializing to the database, on invocation of a said content server to transmit a said digital content piece to a said prospective target, a fact of that transmission to that prospective target.

15. The method as in any one of claims 1 and 10, in which step (B) includes generating the actions additionally based on a library of possible actions.

16. The method as in any one of claim 1 and 10, in which the step of queuing a set of actions to the digital cache for a respective prospective target includes removing from the cache any prior stored sets of actions for that target.

17. A method of mass generation of customized digital content, comprising executing on a digital data processing system steps of:
    A. identifying, continuously, current external events taken by or with respect to a plurality of respective prospective targets of customized digital content pieces, where each external event is one taken (i) by the respective prospective target, or (ii) with respect to that prospective target other than as part of this method of customized digital content generation,
    B. generating, continuously and concurrently with the step of identifying current external events in step (A), identifiers of respective prospective targets, where those identifiers are generated on a round-robin basis from among a list of identifiers of known respective prospective targets,
    C. generating, continuously and upon identification of a current event taken with respect to a said prospective target, a set of one or more actions, each identifying a digital content piece and a delivery mechanism therefor, where each such action is generated based on (i) one or more current external events, if any, identified in step (A) for the respective prospective target, and (ii) any of prior information about, and events taken by or with respect to, that respective prospective target as reflected in a database of information and prior events (the "database"),
    D. queuing to a digital cache each set of actions continuously and upon its generation in step (C),
    E. retrieving, continuously and on a first-in-first-out basis, sets queued to the digital cache, and selecting, continuously and upon retrieval of each such set, an action for generation of digital content customized for the prospective target of that action, where the action is selected from the set of one or more actions based on quotas associated with (i) that prospective target and (ii) the delivery mechanism identified for that action,
    F. invoking, continuously and on selection of a said action in step (D), a content server for the delivery mechanism identified for that selected action to transmit to the prospective target the digital content piece identified with that selected action,
    F. responding to a request by a content server associated with a said delivery mechanism by
        i) pulling a set of n prioritized actions for that said delivery mechanism, where the pulling step includes executing a request in the following form on the digital cache
            call pull(destID, n)→set of n highest priority actions or less if there are no actions available:
                select * from Cache where DestinationID=destID
                    and TimeToCommunicate<=now( ) ordered by
                    priority desc limit n,
                where destID and DestinationID are an identification
                    associated with that said delivery mechanism, and
                    TimeToCommunicate is a time-based parameter,
        ii) transmitting the set of prioritized actions to the requesting content server, and
    G. responding, with the requesting content server, to interaction between the associated said delivery mechanism and a prospective target by executing a said action generated for that prospective target in the set of prioritized actions in order to generate digital content therefor.

18. The method of claim 17, comprising invoking one or more content servers to transmit over 100,000 digital content pieces to different respective targets per day.

19. The method of claim 17, wherein the step of generating identifiers includes generating identifiers of respective prospective targets asynchronously with respect to Identification of current external events with respect to those respective prospective targets.

20. The method of claim 17, wherein the step of identifying current external events includes ingesting one or more incoming streams of events.

21. The method of claim 20, wherein the step of ingesting streams of event includes ingesting streams from any of the web, social media, call centers, transaction servers, and data warehouses.

22. A method of mass generation of customized digital content, comprising executing on a digital data processing system steps of:
- A. identifying, continuously, current external events taken by or with respect to a plurality of respective prospective targets of customized digital content pieces, where each external event is one taken (i) by the respective prospective target, or (ii) with respect to that prospective target other than as part of this method of customized digital content generation,
- B. generating, continuously and upon identification of a current event taken with respect to a said respective prospective target, a set of one or more actions, each identifying a digital content piece and a digital delivery mechanism therefor, where each such action is generated based on (i) one or more current external events identified in step (A) for the respective prospective target, and (ii) any of prior information about, and events taken by or with respect to, that respective prospective target as reflected in a database of information and prior events (the "database"),
- C. queuing to a digital cache each set of actions continuously and upon its generation in step (B),
- D. responding to a request by a content server associated with a said delivery mechanism by
  - i) pulling a set of n prioritized actions for that said delivery mechanism, where the pulling step includes executing a request in the following form on the digital cache
    call pull(destID, n)→set of n highest priority actions or less if there are no actions available:
    select * from Cache where DestinationID=destID and TimeToCommunicate<=now( ) ordered by priority desc limit n,
    where destID and DestinationID are an identification associated with that said delivery mechanism, and TimeToCommunicate is a time-based parameter,
  - ii) transmitting the set of prioritized actions to the requesting content server, and
- E. responding, with the requesting content server, to interaction between the associated said delivery mechanism and a prospective target by executing a said action generated for that prospective target in the set of prioritized actions in order to generate digital content therefor.

23. A method of mass generation of customized digital content, comprising executing on a digital data processing system steps of:
- A. identifying, continuously, current external events taken by or with respect to a plurality of respective prospective targets of customized digital content pieces, where each external event is one taken (i) by the respective prospective target, or (ii) with respect to that prospective target other than as part of this method of customized digital content generation,
- B. generating, continuously and upon identification of a current event taken with respect to a said respective prospective target, a set of one or more actions, each identifying a digital content piece and a digital delivery mechanism therefor, where each such action is generated based on (i) one or more current external events identified in step (A) for the respective prospective target, and (ii) any of prior information about, and events taken by or with respect to, that respective prospective target as reflected in a database of information and prior events (the "database"),
- C. queuing to a digital cache each set of actions continuously and upon its generation in step (B),
- D. responding to a request by a content server associated with a said delivery mechanism by
  - i) pulling a set of n prioritized actions for that said delivery mechanism, where the pulling step includes executing a request in the following form on the digital cache
    call pull(destID, n)→set of n highest priority actions or less if there are no actions available:
    select * from Cache where DestinationID=destID and TimeToCommunicate<=now( ) ordered by priority desc limit n,
    where destID and DestinationID are an identification associated with that said delivery mechanism, and TimeToCommunicate is a time-based parameter,
  - ii) transmitting the set of prioritized actions to the requesting content server, and
- E. responding, with the requesting content server, to interaction between the associated said delivery mechanism and a prospective target by executing a said action generated for that prospective target in the set of prioritized actions in order to generate digital content therefor.

* * * * *